United States Patent
Gobin et al.

(10) Patent No.: US 6,745,229 B1
(45) Date of Patent: Jun. 1, 2004

(54) WEB BASED INTEGRATED CUSTOMER INTERFACE FOR INVOICE REPORTING

(75) Inventors: Parmeshwar Gobin, Bronx, NY (US); Henry Huntington Hall, Danbury, CT (US); Carla Reale Hauryluck, Rye Brook, NY (US); Daniel Robert Kanze, New Fairland, CT (US); Steven William Liburd, Mt. Vernon, NY (US); Kirk Van Sandt, Peyton, CO (US); Jia Huei Swei, Briarcliff Manor, NY (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,405

(22) Filed: Sep. 24, 1998

Related U.S. Application Data

(60) Provisional application No. 60/060,655, filed on Sep. 26, 1997.

(51) Int. Cl.[7] .................................................. G06F 15/16
(52) U.S. Cl. ......................................... 709/206; 705/40
(58) Field of Search ................................. 709/218, 223, 709/206, 224; 705/29, 30, 34, 40; 379/201, 265, 112

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A * | 3/1989 | Komatsu et al. ............ 364/900 |
| 4,823,373 A | 4/1989 | Takahashi et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,088,052 A | 2/1992 | Spielman et al. |
| 5,131,020 A | 7/1992 | Liebesny et al. |
| 5,136,707 A | 8/1992 | Block et al. |
| 5,208,908 A | 5/1993 | Harrison et al. |

(List continued on next page.)

FOREIGN PATENT DOCUMENTS

| | | |
|---|---|---|
| EP | 0 747 841 | 12/1996 |
| EP | 0 809 387 A2 | 5/1997 |
| JP | 09064870 A | 3/1997 |
| WO | WO97/11443 | 3/1997 |
| WO | 97/18515 | 5/1997 |
| WO | WO 97/23988 | 7/1997 |
| WO | WO 98/19472 | 5/1998 |
| WO | WO 99/01826 | 1/1999 |

OTHER PUBLICATIONS

Microsoft Access User's Guide, Microsoft Corporation, pp. 378,594–599, 630–632 (13), 1994.*

Biggs, M., "Help for the Web enhances customer support, reduces help desk load" *Infoworld*, Jun. 16, 1997, v. 19. No. 24, pp. 82+.

(List continued on next page.)

*Primary Examiner*—Bunjob Jaroenchonwanit

(57) ABSTRACT

A Web-based invoice viewing system and method for enabling a customer to generate invoices relating to various network services provided to the customer by an enterprise. A Web enabled invoice viewing system provides billing and invoice information to remote customers having a workstation with a Web browser and an Internet access. A graphical user interface system at the customer workstation presents a list of invoice documents organized into products and date ranges applicable to the customer for the customer to select and view. Various displays presented at the customer workstation may be printed, faxed, or queued for batch printing at the enterprise remotely. The customer is enabled to view dynamically summed results of numerical figures displayed on the invoice documents by highlighting the numbers in the document directly on the display.

22 Claims, 17 Drawing Sheets

U.S. PATENT DOCUMENTS

| | | |
|---|---|---|
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,483,596 A | 1/1996 | Rosenow et al. |
| 5,490,060 A | 2/1996 | Malec et al. |
| 5,491,779 A | 2/1996 | Bezjian |
| 5,491,796 A | 2/1996 | Wanderer et al. |
| 5,506,893 A | 4/1996 | Buscher et al. |
| 5,526,257 A | 6/1996 | Lerner |
| 5,530,744 A | 6/1996 | Charalambous et al. |
| 5,533,108 A | 7/1996 | Harris et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,557,668 A | 9/1996 | Brady |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,694,546 A | 12/1997 | Reisman |
| 5,696,906 A | 12/1997 | Peters et al. |
| 5,699,403 A | 12/1997 | Ronnen |
| 5,699,528 A * | 12/1997 | Hogan ..................... 395/240 |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagel et al. |
| 5,764,756 A | 6/1998 | Onweller |
| 5,768,501 A | 6/1998 | Lewis |
| 5,774,660 A | 6/1998 | Brendel et al. |
| 5,774,670 A | 6/1998 | Montulli |
| 5,778,178 A | 7/1998 | Arunachalam |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,694 A | 8/1998 | Akiba et al. |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A | 10/1998 | O'Reilly et al. |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,867,495 A | 2/1999 | Elliott et al. |
| 5,870,558 A | 2/1999 | Branton, Jr. et al. |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A | 9/1999 | Hartman et al. |
| 5,961,602 A | 10/1999 | Thompson et al. |
| 5,963,925 A * | 10/1999 | Kolling et al. ................ 705/40 |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |
| 5,987,523 A | 11/1999 | Hind et al. |
| 5,991,733 A | 11/1999 | Aleia et al. |
| 5,991,746 A | 11/1999 | Wang |

| | | |
|---|---|---|
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A * | 3/2000 | Neely .................. 705/34 |
| 6,049,602 A | 4/2000 | Foladare et al. |
| 6,058,170 A | 5/2000 | Jagadish et al. |
| 6,058,381 A | 5/2000 | Nelson |
| 6,064,667 A | 5/2000 | Gisby et al. |
| 6,065,059 A | 5/2000 | Shieh et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,084,953 A | 7/2000 | Bardenheuer et al. |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccabee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A | 9/2000 | Brown |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. .................. 709/203 |
| 6,161,128 A | 12/2000 | Smyk |
| 6,163,597 A | 12/2000 | Voit |
| 6,173,311 B1 | 1/2001 | Hassett et al. |
| 6,182,113 B1 | 1/2001 | Narayanaswami |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,275,490 B1 | 8/2001 | Mattaway et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,377,993 B1 | 4/2002 | Brandt et al. |
| 2001/0001014 A1 | 5/2001 | Akins, III et al. |

OTHER PUBLICATIONS

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www/scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility", Product Announcement, *Edge*, Oct. 2, 1995, on & about AT&T, v. 10, n. 375, p. 11(1).

"New software platform enhances network management capabilities . . . ", *Business Wire*, Sep. 28, 1995 p. 9281122.

Jainschigg, J., "Billing confirmed: this easy–to–use box turns guest calls into revenue." *Teleconnect*, vol. 12, No. 9, p. 39(4).

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1— s46–03–5.

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

Morgan, Rick, "When Ised Right, Internet can be Effective Marketing Tool", Madison Capital Times, Madison, WI, Nov. 8, 1996, extracted from http://proquest.umi.com on internet in Feb. 28, 2002.

Quadri et al., Hewlett–Packard and Cisco Systems, "Internet Usage Platform", White Paper.

"HP and Cisco Deliver Internet Usage Platform and Billing and Analysis Solutions. New Platform and Solutions Allow ISPs and Carriers to Offer Value–added Services", Copyright 1998 Cisco Systems Inc. http://www.cisco.com/warp/public/146/pressroom/1998/apr98/28.html.

"Release Note for Netflow FlowCollector Release 2.0." ©Jul. 1998 and "Release Notes for Netflow FlowAnalyzer Release 1.0" ©Sep. 1997.

Meterorology; Databases, "Inforonics offers controlled access to Web Meterology", Information Today, Apr. 97, vol. 14 Issue 4, p53, 2p. This article reports that Inforonics has developed a controlled access gateway to MGA (Meteorological and Geoastrophysica).

Inoue et al., "Secure Mobile IP Using Security Primitives", IEEE 1997.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

\* cited by examiner

Invoice: 0615462145

File  Find  Page  View  Help

[Find] [Back] [Next] [Retrieve] [Print] [Help] [Cust. Service]

SUMMARY OF AMOUNT DUE

CITICORP USCPG (CORP. FEATURE)    BILLING PERIOD 06/01/98 THROUGH 06/30/98
12355 SUNRISE VALLEY DRIVE  ATTN: INVOICE ADMINISTRATION
RESTON, VA 22091

CUSTOMER NUMBER 99991477    BILL PAYER Y0051360    NODE NO. 00099156

| DESCRIPTION | CORPORATE LEVEL CHARGES | LOCATION LEVEL CHARGES |
|---|---|---|

CURRENT CHARGES UNDER CITICORP/MCI/CITIBANK SD 99991477 99991477

| | | |
|---|---|---|
| LONG DISTANCE USAGE CHARGES* | | |
| DOMESTIC | $0.00 | $0.00 |
| INTERNATIONAL DDD | 0.00 | 0.00 |
| CUSTOMIZED ANNOUNCEMENTS | 0.00 | 0.00 |
| DIRECTORY ASSISTANCE | 0.00 | 0.00 |
| TOTAL | $0.00 | $0.00 |
| NON-USAGE | | |
| FEATURES | $0.00 | $0.00 |
| SUPPLEMENTAL CHARGES** | 0.00 | 0.00 |
| ALLOCATED CHARGES*** | 35,000.53 | 0.00 |
| MISCELLANEOUS**** | 0.00 | 0.00 |

Page: 1 (in range 1 to 3)

FIG. 9

| | First | Prior | New | Last | Go To | Magnify | Shrink | Reset | |
|---|---|---|---|---|---|---|---|---|---|

TERMINATION:
| | | | | | |
|---|---|---|---|---|---|
| DOMESTIC DEDICATED | 1,031 | 5,175.5 | $0.00 | $365.43 | 90.3 |
| DOMESTIC SHARED | 1,481 | 3,076.7 | 0.03 | 361.06 | 82.1 |
| INTERNATIONAL DDD | 306 | 619.7 | 0.00 | 0.00 | 0.0 |
| CUSTOMIZED ANNOUNCEMENTS | 0 | 0.0 | 0.00 | 0.00 | 0.0 |
| DIRECTORY ASSISTANCE | 0 | 0.0 | 0.00 | 0.00 | 0.0 |
| USAGE TOTAL | 2,755 | 8,871.9 | $0.03 | $1,141.86 | 84.6 |

TOTAL
TERMINATION:
| | | | | | |
|---|---|---|---|---|---|
| DOMESTIC DEDICATED | 1,031 | 5,175.5 | $0.00 | $365.43 | 90.3 |
| DOMESTIC SHARED | 1,481 | 3,076.7 | 0.03 | 361.06 | 82.1 |
| INTERNATIONAL DDD | 306 | 619.7 | 0.00 | 0.00 | 0.0 |
| CUSTOMIZED ANNOUNCEMENTS | 0 | 0.0 | 0.00 | 0.00 | 0.0 |
| DIRECTORY ASSISTANCE | 0 | 0.0 | 0.00 | 0.00 | 0.0 |
| USAGE TOTAL* | 2,755 | 8,871.9 | $0.03 | $1,141.86 | 84.6 |

FIG. 13

Batch Print Data Entry: Document Invoice #000063993549 — 740

Requestor Info:

- Name:
- MCI Mail ID: (employee only)   Dept/Loc:
- Phone #(with Area Code):

Ship To Info:

- Contact Name:
- Company:
- Dept/Loc:
- Address:
  (No Post Office Boxes Please)
- City:   State:
- Zip:
- Contact Phone (With Area Code):

Pages To Print:

Start Page: 1   End Page: 2

742 ✓ OK   744 Clear   ✗ Cancel

FIG. 17

WEB BASED INTEGRATED CUSTOMER INTERFACE FOR INVOICE REPORTING

CROSS-REFERENCE TO RELATED APPLICATIONS

The following patent application is based on and claims the benefit of U.S. Provisional Patent Application Serial No. 60/060,655 filed Sep. 26, 1997, entitled INTEGRATED CUSTOMER INTERFACE SYSTEM FOR COMMUNICATIONS MANAGEMENT.

BACKGROUND OF THE INVENTION

1. Field of the Invention

The present invention relates generally to information delivery systems and, particularly, to a novel, WWW/Internet-based, invoice viewing service for customers requesting information located at the remote back-end server of telecommunications service entities.

2. Background Art

Each of the major telecommunications service entities, e.g., MCI, AT&T, and Sprint, presently provides for the presentation and dissemination of customer invoice account and network management information to their customers through a Windows-based graphical user interface resident on a personal computer. Typically, service entity customers are enabled to directly dial-up, e.g., via a modem, or, alternately, via dedicated communication lines, e.g., ISDN, T-1, etc., to the entity's application and database servers, and initiate the generation of reports of their requested account information through the reporting graphical user interface (GUI). The report requests initiated by the customer are processed by the entity's application server, which retrieves the requested customer information from one or more databases, processes and formats the information for downloading to the client's reporting GUI.

Most telecommunications service providers offer many different services, and many of the associated service applications have been developed independently over time, and, operate on different legacy platforms. For instance, MCI's Service View platform ("MSV") provides customers with Windows based client-server applications for customer network management and call usage analysis. These applications, run independently of one another and can only generate application specific reports one at a time. For example, applications such as the Toll Free Network Manager which generates toll free network management data reports, Perspective which generates reports on priced call detail data for usage analysis and trending, and TrafficView which generates unpriced call detail or real-time data reports, each requires a different reporting mechanism due to the nature of the data being presented. In addition, because there are little cross application interoperability and data sharing, a customer must always use the separate applications to gain access to their data including specific invoice data associated with the separate applications.

Furthermore, the implementation mechanism of individual application servers frequently relies on the native vendor-supplied listener programs and communication protocols, necessitating code changes in both the server and the workstation programs and subsequent version release, if another vendor happens to supercede the original vendor.

Therefore, it would be highly desirable to provide connectivity between legacy systems and enterprise application servers which would then provide customer connectivity over the public Internet, as the Internet provides access connectivity world wide via the TCP/IP standard, obviating a need to cater programs to specific native vendor-supplied listener programs. It would also be desirable to provide a consolidated Web-based reporting system that provides a common GUI enabling both report requesting, customizing and viewing of various types of data from different server applications in one user session. With the integrated reporting, customers will have the ability to include invoice reports on their traffic and billing reports.

SUMMARY OF THE INVENTION

Accordingly, to resolve the above shortcomings, the present invention provides a Web-based invoice viewing system for online presentation of various billing and invoice documents associated with network services provided to a customer.

The present invention is operable by a customer having at a minimum, a workstation with an off-the-shelf Web browser and an Internet access. The system of the present invention includes a client browser application typically downloaded by the Web browser over the Internet during a session initiation stage. The client browser application provides a common GUI capable of communicating securely with enterprise Intranet applications, allowing the customers access to their billing and invoice reports from anywhere and any platform in the world.

The back-end server operating in the system of the present invention maintains data from the various application services for generating and providing billing and invoice reports. In its operation, the back-end server provides an efficient storage mechanism for storing the data in the most compact format such that the storage space required for storing the data is optimized.

The system of the present invention may include a capability for enabling the customers to sum up numerical figures, such as minutes and charges, by highlighting the numbers directly on the screen displaying the document. Accordingly, the dynamic accumulator functionality may be included in the present invention for providing convenient and flexible mechanisms for obtaining totals or subtotals of numerical figures shown on a displayed document.

With the retrieved documents displayed on a workstation, a customer may print, direct batch printing to be performed remotely at an enterprise, and also fax the document to any customer specified locations. Accordingly, the present invention provides icons or menu items on a display screen for allowing customers to optionally select to print at a customer workstation, send a batch printing job to an enterprise, and also fax customer retrieved documents.

The above and additional features of the present invention are attained preferably with a Web-based invoice viewing system which enables a customer to access, view or display various invoices over the Internet. The invoices generally relate to application services, or more specifically, telecommunications services provided by an enterprise to the customer. The system of the present invention includes a client browser application located at a customer workstation, which is initially downloaded by a Web browser running in the customer workstation. The client browser application enables interactive Web-based communications with the invoice viewing system and provides an integrated interface. The present invention further includes a Java application/applet for providing the invoice viewing specific functionalities. The Java application/applet is typically invoked from the client browser application and is responsible for receiving customer requests and providing customer selected invoice documents at the customer workstation.

At the enterprise side, the present invention includes a number of web servers for managing customer sessions over the Internet. The web servers support a secure socket connection enabling encrypted communications between the client browser application and the web servers. The web servers are physically isolated and firewalled from the enterprise's internal network (Intranet) and also from the public Internet. In addition, the web servers are typically responsible for maintaining the client browser and Java application/applets for downloading to the client workstation.

At the enterprise Intranet, the present invention includes a dispatcher for receiving encrypted transactions from the web servers and dispatching them to specific application servers, and more specifically, to the online invoicing server. The online invoicing server maintains one or more databases having image files associated with documents from various application services. The online invoicing server typically receives invoice request messages from the Java application/applet, accesses the database in response and sends response messages having requested invoice data back to the Java application/applet via the dispatcher and the web servers for presentation at the customer workstation.

Further benefits and advantages of the invention will become apparent from a consideration of the following detailed description.

BRIEF DESCRIPTION OF THE DRAWINGS

Preferred embodiments of the present invention will now be described, by way of example only, with reference to the accompanying drawings in which like reference numbers indicate identical or functionally similar elements, and in which:

FIG. 9 is a sample screen displaying an invoice document;

FIG. 13 is a sample invoice display screen having accumulator buckets used for dynamic summation;

FIG. 17 shows a screen that is displayed when a batch print function is selected.

DETAILED DESCRIPTION OF THE PREFERRED EMBODIMENT OF THE PRESENT INVENTION

An Overview of the Web-enabled Integrated System

The present invention is one component of an integrated suite of customer network management and report applications using a Web browser paradigm. Known as the networkMCI Interact system ("MCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the MCI Interact system architecture is basically organized as a set of common components comprising the following:

1) an object-oriented software architecture detailing the client and server based aspect of MCI Interact;
2) a network architecture defining the physical network needed to satisfy the security and data volume requirements of the networkMCI System;
3) a data architecture detailing the application, back-end or legacy data sources available for networkMCI Interact; and
4) an infrastructure covering security, order entry, fulfillment, billing, self-monitoring, metrics and support.

Each of these common component areas will be generally discussed herein below. A detailed description of each of these components can be found in a related co-pending U.S. patent application Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
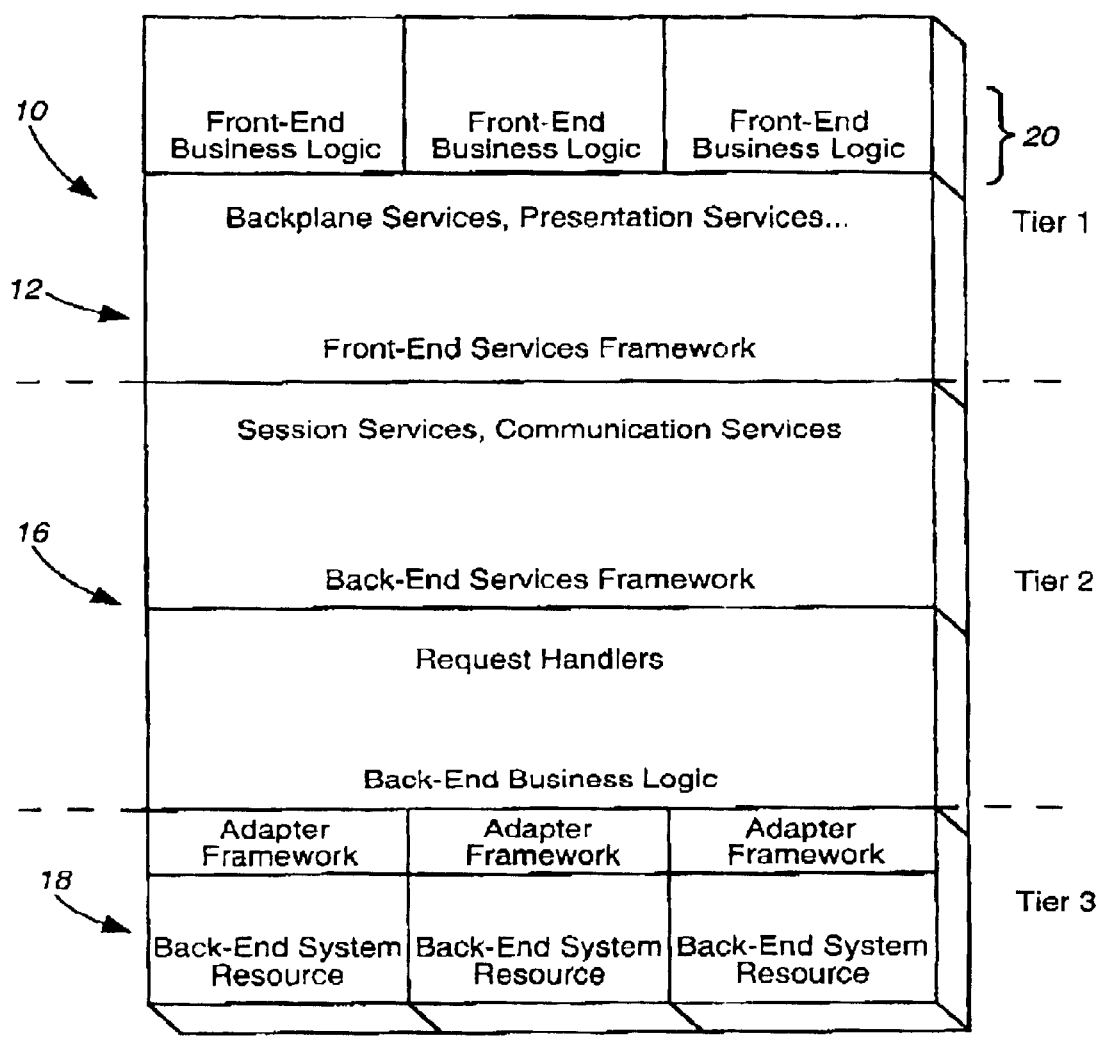
FIG. 1 illustrates the software architecture component comprising a three-tiered structure.

FIG. 1 is a diagrammatic illustration of the software architecture component in which the present invention functions. A first or client tier 10 of software services are resident on a customer workstation 10 and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for Internet communications over the public Internet. Additional applications are directed to front-end services such as the presentation of data in the form of tables and charts, and data processing functions such as sorting and summarizing in a manner such that multiple programs are combined in a unified application suite. A second or middle tier 16, is provided having secure web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

Generally, as described in co-pending U.S. patent application Ser. No. 09/159,515 now U.S. Pat. No. 6,115,040, issued on Sep. 5, 2000, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specially, the client-tier software is created and distributed as a set of Java classes including the applet classes to provide and industrial strength, object-oriented environment over the Internet. Application-specific classes are designed to support the functionality and server interface for each application of two-types: 1) cross-product, for example, inbox and reporting functions, and 2) product specific, for example toll free network manager or call management functions. The system is callable of delivering to customers the functionality appropriate to the product mix.

Figure 2:
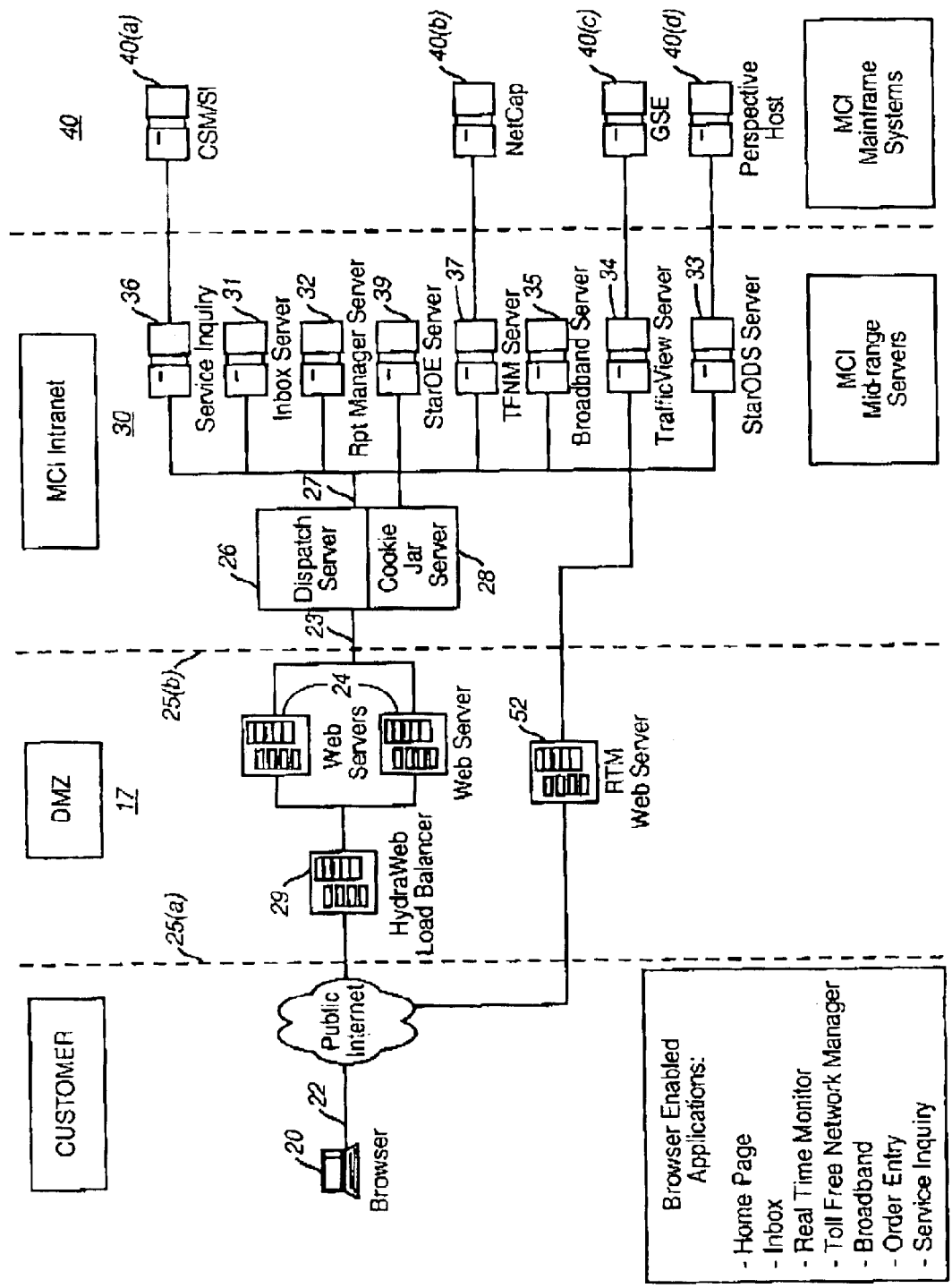
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30,and the data warehouses, legacy systems, etc. 40.

Figure 3:
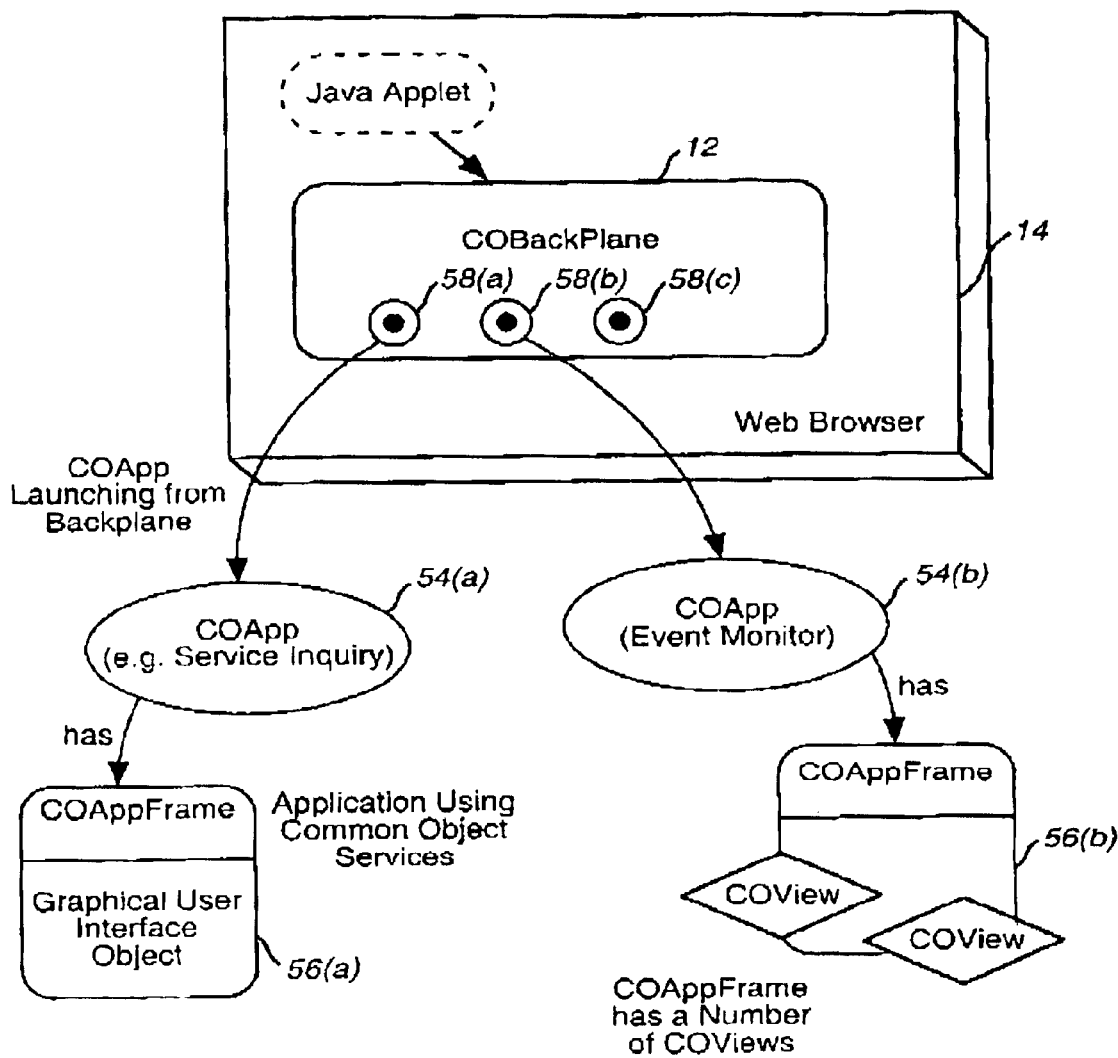
FIG. 3 is an illustrative example of a backplane architecture schematic.

The Customer Browser 20, is browser enabled and include client applications responsible for presentation and front-end services. Its functions include proofing a user interface to various MCI services and supporting communications with MCI's Intranet web server cluster 24. As illustrated in FIG. 3, and more specifically described in the above-mentioned U.S. Pat. No. 6,115,040, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The networkMCI Interact common set of objects provides a set of services to each of the applications. The set of services include: 1) session management; 2) application launch; 3) inter-application communications; 4) window navigation among applications; 5) log management; and 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which may be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58*a,b,c* selectable by the user. As illustrated in FIG. 3, upon selection of an application, the backplane 12 launches that specific application, for example, Service Inquiry 54*a* or Event Monitor 54*b*, by creating the application object. In processing its functions, each application in turn, may utilize common object services provided by the backplane 12. FIG. 3 shows graphical user interface objects 56*a,b* created and used by a respective application 54*a,b* for its own presentation purposes.

Figure 4:
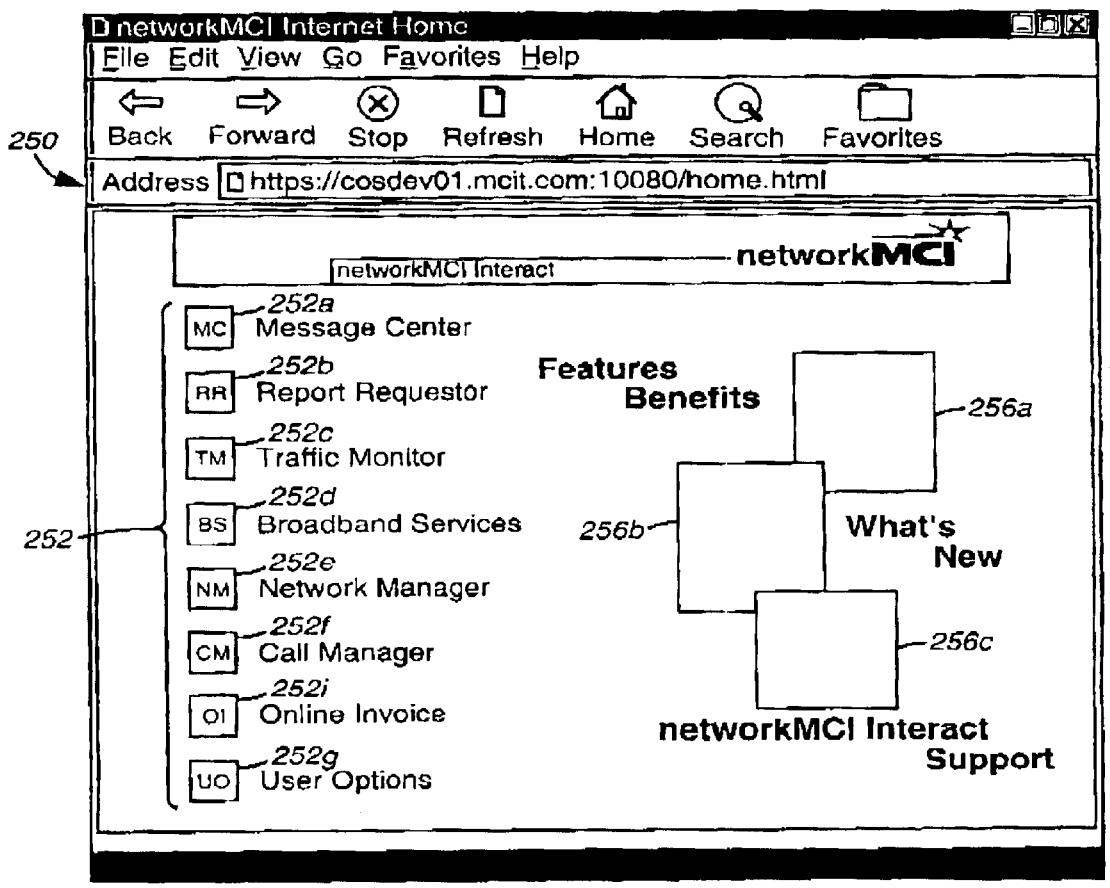
FIG. 4 illustrates an example client GUI presented to the client/customer as a browser web page.

FIG. 4 illustrates an example client GUI presented to the client/customer as a browser web page 250 providing, for example, a suite 252 of network management reporting applications including: MCI Traffic Monitor 252*c*; Call Manager 252*f*; a Network Manager 252*e* and online Invoice 252*i*. Access to network functionality is also provided through Report Requester 252*b*, which provides a variety of detailed reports for the client/customer and a Message Center 252*a* for providing enhancements and functionality to traditional e-mail communications.

As shown in FIGS. 3 and 4,the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54*a*, 54*b*, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init ( ), start ( ), stop ( ) and run ( ). In the inito method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp ( ) method. The launched application then may use the backplane for inter-application communications, including retrieving Inbox data.

The COBackPlane 12 includes methods for providing a reference to a particular COApp, for interoperation. For example, the COBackPlane class provides a getApp ( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

As described in greater detail in co-pending U.S. patent application No. 09/159,514 entitled SECURE CUSTOMER INTERFACE FOR WEB-BASED DATA MANAGEMENT, the contents and disclosure of which are incorporated by reference as if fully set forth herein, a networkMCI Interact session is designated by a long, successful authentication, followed by use of server resources, and logoff. However, the world-wide web communications protocol uses HTTP, a stateless protocol, each HTTP request and reply is a separate TCP/IP connection, completely independent of all previous or future connections between the same server or client. The MCI Interact system is implemented with a secure version of HTTP such as S-HTTP or HTTPS, and preferably utilizes the SSL implementation of HTTPS. The preferred embodiment uses SSL, which provides a cipher spec message for server authentication during a session. The preferred embodiment further associates a given HTTPS request with a logical session which is initiated and tracked by a cookie jar server 28 to generate a cookie, which is a unique server-generated key that is sent to the client along with each reply to a HTTPS request. The client holds the cookie and returns it to the server as part of each subsequent HTTPS request. As described, either the Web servers 24, the cookie jar server 28, or the Dispatch Sever 26, may maintain the cookie jar to map these keys to the associated session. A separate cookie jar server 28, as illustrated in FIG. 2 has been found desirable to minimize the load on the dispatch server 26. This form of session management also functions as an authentication of each HTTPS request, adding an addition level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the StarOE server 49 at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages; a Report Manager proxy capable of communicating with a system-specific Report Manager server 32 for generation, management and receipt notification of customized reports; a Report Scheduler proxy for performing the scheduling and requests of the customized reports. The customized reports include, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)–(d) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the Internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
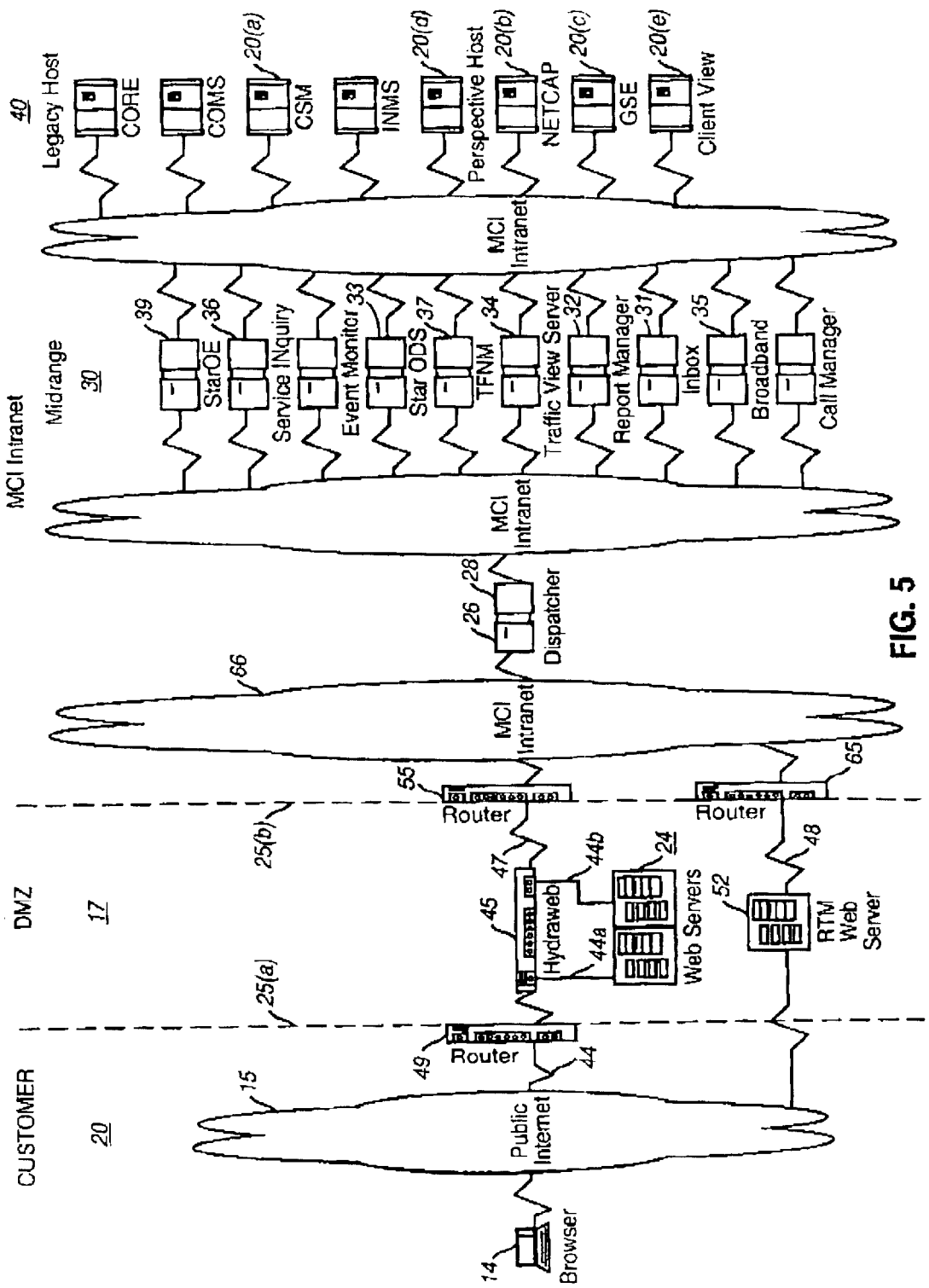
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back-end business logic applications.

As illustrated in FIG. 5, the present invention includes a double or complex firewall system that creates a "demilitarized zone" (DMZ) between two firewalls 25a, 25b. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The HydraWEB™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant HydraWEB™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the HydraWEB™ unit 45, a TCP/IP connection 38 links the Secure Web server 24 with the MCI Intranet Dispatcher server 26.

Further as shown in the DMZ 17 is a second RTM server 52 having its connection to the public Internet via a TCP/IP connection 48. As described in co-pending U.S. patent application Ser. No. 09/159,516 entitled INTEGRATED PROXY INTERFACE FOR WEB PAGES TELECOMMUNICATIONS MANAGEMENT TOOLS, incorporated by reference as if fully set forth herein, this RTM server provides real-time session management for subscribers of the networkMCI Interact Real Time Monitoring system. An addition TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWEB™ 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the Mci Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. (D# 11038), the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which may be used by the GUI applications and by the mid-range servers. Such common data includes but are not limited to: customer security profiles, billing hierarchies for each customer, general reference data (states, NPA's, Country codes), and customer specific pick lists: e.g., ANI's, calling cards, etc. An MCI Internet StarOE server manages the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data is typically resident in a Report Manager server database and managed by the report manager.

The Infrastructure component of the MCI Reporting system includes mechanisms for providing secure communications regardless of the data content being communicated. As described in detail in above-reference, co-pending U.S. patent application No. 09/159,514, the MCI Interact system security infrastructure includes: 1) authentication, including the use of passwords and digital certificates; 2) public key encryption, such as employed a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the Mci Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; and, 14) Online Invoicing.

The self-monitoring infrastructure component for Mci Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for Mci Interact is the employment of mechanisms to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. Patent Application No. PCT/US98/20095, the client-tier software is organized into a "component" architecture supporting such applications as inbox fetch and inbox management, report viewer and report requestor, TFNM, Event Monitor, Broadband, Real-Time Monitor, and system administration applications. Further functionality integrated into the software architecture includes applications such as Outbound Network Manager, Call Manager, Service Inquiry and Online Invoicing.

Online Invoicing

Figure 6:
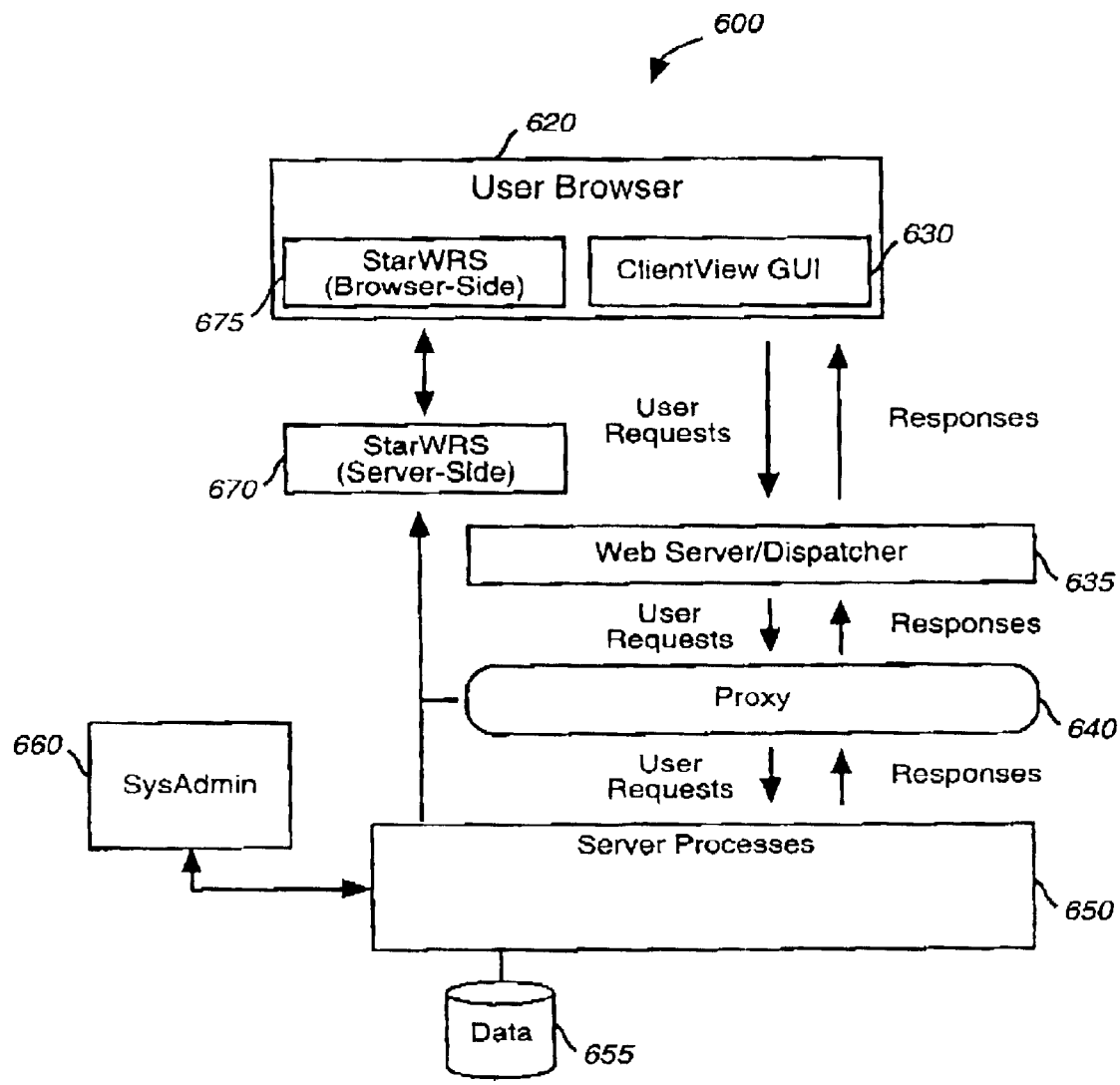
FIG. 6 illustrates the online invoicing architectural scheme.

The present invention is directed to a system, referred to as online invoicing, which offers customers visibility into all of their invoices. The online invoicing provides the ability to view invoices and reports online, and offers a facility for printing and faxing documents. The online invoicing takes information available from different billing systems and incorporates that information into its database. The information is then retrieved and presented to a user according to the user-specified requests. A general block diagram illustrating the online invoicing system architecture 600, integrated with the networkMCI Interact platform, is shown in FIG. 6. In accordance with the invention, a first component includes a user browser 620,for example, the Internet Explorer® 4.0, deploying a backplane applet via which the online invoicing GUI client application 630 may be invoked. As described in reference to FIGS. 3 and 4, the application backplane is a Java® applet invoked inside the networkMCI Interact's home page and is the conduit through which all other client applications may be deployed, including the online invoicing GUI client application 630. The online invoicing may typically be accessed from the home page (FIG. 4) with an icon labeled "Online Invoices" 252i (FIG. 4). A online invoicing session begins when a customer clicks on the online invoices icon, triggering the backplane to launch the client GUI application 630.

The online invoicing GUI client application 630 provides an interface to which a customer may request and view various billing invoices associated with the application services subscribed by the customer and provided by the networkMCI Interact system. For example, using the GUI client application 630, customers may drill down on their applicable invoices, typically accessing them via the given customer identifiers such as the corp id, bill payer, or mega account numbers. The invoice reports may also be available for various application services including toll free, Frame Relay, and ATM.

Also shown as part of the online invoicing invoice viewing system architecture 600 of FIG. 6 is a Web server/dispatcher component 635 which provides for the transport between the Web browser and an online invoicing proxy interface including all secure communications and encryption. In the preferred embodiment, secure communication from the user browser 620 to a DMZ Web server 635 is enabled over a first TCP/IP socket connection, such as SSL, and communications from the DMZ Web server over an enterprise firewall (not shown) to the dispatcher server is enabled over a second TCP/IP socket connection. These paths enable customer requests and server responses to be communicated from the user browser 620 to the online invoicing server 650.

Specifically, the dispatcher 635 forwards user requests, such as "get index" message for retrieving a list of documents available for viewing by a customer, to the online invoicing server 650 process that employs an integrated proxy application 640 for receiving and interpreting the user messages and performing the online invoicing functionality. This proxy capability includes a multithreaded engine enabling multiple, simultaneously executing sessions supporting anticipated user load. The interface between the dispatcher server 635 and the online invoicing server 650 is also message-based, employing, e.g., TCP/IP socket transport, and, as will be described, a messaging protocol that is defined and which includes a generic message header followed by proxy-specific data. The same process of messaging scheme is employed in the other direction. That is, the online invoicing proxy 640 sends the generic header, followed by the proxy-specific response back to the dispatch server 635 for communications over the firewall and back to the user browser 620.

The online invoicing proxy 640 uses the networkMCI Interact platform's "template proxy" as an implementation of the listener/slave portion of the proxy. The proxy 640 passively listens on a previously defined port number and forks a process on an interrupt basis, after which the parent proxy continues to listen for other request. The forked process is generally dedicated to handling the detected requests. The forked process detects a transaction type from the proxy protocol header. The transaction types generally include synchronous, asynchronous, and bulk transfer, as described above. The proxy 640 then calls a "back-end" function whose function is dependent on the transaction type detected. The back-end functions typically provide individual services for which the application is responsible.

For example, if the transaction type for a detected request is of "synch" type, the forked process executes the synch back-end function and passes the request as an argument. The synch back-end function generally passes the request to a CICS task on the online invoicing server and waits for a response. More specifically, the synch function first establishes a CICS task via a direct TCP/IP socket connection to the CICS TCP/IP interface service. The synch function then waits for a response indicating whether a connection was successfully established or an error occurred. If an error is occurred, an error response from the CICS task is returned to the synch function, which then terminates appropriately.

If a connection to the CICS task is successfully established, the request is sent to the task and the synch function waits on a response. The response is generally preceded with a preamble block, indicating the status of request and the number of bytes to follow. The preamble block may include an error code, indicating error conditions that may have occurred during the CICS task processing. Certain error indications may prompt the synch function to terminate the CICS task connection, and also to exit the synch function.

If the preamble block indicates that the request was successfully processed, the preamble block is returned, and the byte count specified in the preamble block is piped from the CICS task, to the requesting process, and typically all the way back to the client GUI application. Upon completion of piping the data, the synch function disconnects the CICS task and exits. The forked process which called the synch function also terminates itself by exiting.

In the preferred embodiment, the online invoicing server 650 stores documents from various billing systems and performs the various database queries and function calls in response to requests received from the customer via the online invoicing proxy 640. Particularly, the online invoicing server 650 is responsible for tasks including data collection, calculation, storage, and report generation. A more detailed description of the server 650 is provided with reference to FIGS. 11 and 12.

During its operation, the online invoicing server 650 supports communications with a system administration component ("StarOE") 660 which provides order entry functions including functionality necessary to manage (create, update, delete) online invoicing users, and allows for a feed of the appropriate order entry information to the online invoicing server 650 in order to properly associate the appropriate online invoicing functionality and data to the right customer once given admission to the online invoicing invoice viewing service. The StarOE process 660 essentially functions to provide the mechanisms for authenticating users, and supplying entitlement information, as well as enabling order entry for the various online invoicing invoice viewing services.

As described previously, order entry for the networkMCI Interact browser and all applications on networkMCI may be made through the networkMCI StarOE order entry system. The online invoicing application service may be ordered for all business markets customers. For example, a user may select to have online invoicing invoices for a given enterprise, corp, bill payer, and/or mega account number. These include all NCBS, Toll Free, PLBS, and Mega invoices. In addition, selections may include invoice images for MCI CVNS-ROW, MCI CVNS-Mexico, MCI CVNS-Canada as well as Stentor Advantage Vnet/CVNS invoice images.

In the preferred embodiment, a messaging interface is utilized between the StarOE 660 and the online invoicing server 650 for communications mechanisms. The online invoicing server 650, typically functions as a client and receives authentication information, billing ids, and level of service information, which may also be supplied in response to the launch of the online invoicing GUI client application 630. For example, when online invoicing client application 630 is launched from the home page (FIG. 4), a customer identifier such as the userid and the applicable corp ids and mega account numbers may be retrieved by the order entry system administration server, StarOE 660, and passed to the online invoicing server 650. The online invoicing server 650 then makes the necessary association to individual bill payers that the user is authorized to view. The view of invoices may include a particular portion of the invoice as well as the entire invoice.

The online invoicing server 650 also may interact with the inbox, a component of the networkMCI Interact reporting system, StarWRS 670, by storing the news information regarding the online invoicing service. Detailed functionalities of the inbox and the StarWRS systems are described in the co-pending U.S. application Ser. Nos. 09/159,512 and 09/159,409 respectively, and are incorporated herein by reference thereto. Generally, the inbox is a central repository for holding messages, which may include event notifications, and report data from the networkMCI Interact application services, including the online invoicing application service. The files may be transferred by using one or more of the following transport mechanisms: synchronous transaction, asynchronous transaction, and synchronous bulk transfer. These transports mechanisms are provided by the networkMCI Interact's application program interfaces (APIs) for enabling the proxies to communicate with the user browser 600 and intervening Web servers and dispatcher 635. As an alternative to the above listed transports, the online invoicing server 650 may use the file transport protocol (FTP) "put" command for very larg transfers, in order to obviate some of the network loads.

In addition, the invoice files saved on the inbox may be retrieved and viewed using the report requestor and the report viewer, two additional components of the StarWRS 675 residing in the user browser 600. Via the report requestor, the customer may request tailored reports regarding the invoice files and view or print the customized invoice reports displayed by the report viewer as described in the co-pending U.S. application Ser. Nos. 09/159,512 and 09/159,409.

Figure 10:
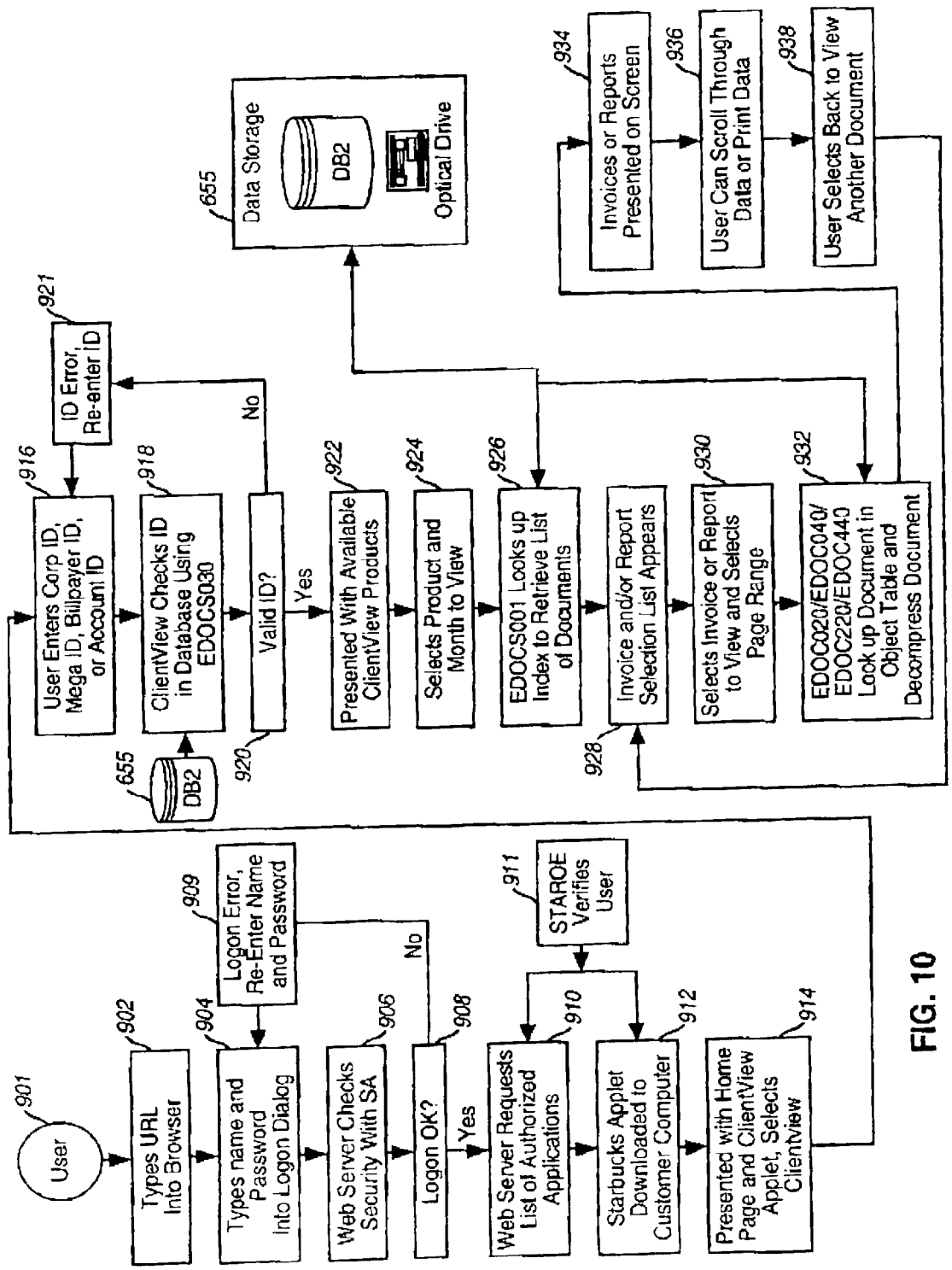
FIG. 10 is a flow diagram illustrating an online invoicing process flow.

FIG. 10 is a flow diagram 900 illustrating an example of the networkMCI Interact online invoicing process flow in detail. At step 902, a user 901 types an appropriate URL for retrieving the networkMCI Interact logon page, and types name and password into the logon dialog at step 904. At step 906, the Web server receives the name and password and checks with the StarOE system administration function to verify that the entered name and password are correct. If the user is not validated properly at step 908, the user is again prompted at step 909 to re-enter the name and password. If the user entered name and password is properly authenticated via the StarOE, at step 910, the Web server requests a list of authorized applications for the user from the StarOE. At step 912, the Web server then downloads the appropriate client application files and at step 914 presents the networkMCI Interact homepage to the user from which the user may select the online invoice functionality.

Upon the selection, an online invoice screen is presented. At step 916, the user then enters the customer identifiers on the online invoice screen. The user entered customer identifier is then checked against the available list of customer identifiers in the online invoice server's database at step 918. If the customer identifier does not exist or is not a valid type at step 920, the user is prompted to re-enter the identifier at step 919. When the customer identifier is properly validated, the user is presented with the online invoicing products associated with the customer identifier at step 922. The user then may select products by their date ranges at step 924 for viewing. At step 926, a server module then retrieves a list of document based on the selected product and date range from the online invoicing database, and at step 928, the list is presented to the user, from which the user may select to view a document, at step 930. Upon the user selection, the server modules retrieve the document from the database at step 932. At step 934, the invoice and/or report documents are presented to the user at the user's workstation. At step 936, the user may scroll through, or print the data presented, or the user may, at step 938, select to view another document at step 928.

The information stored in the database 655 generally originate from different billing systems. When data is available from these billing systems, the online invoicing server typically performs a conversion process and stores the converted data on tape until an audit approval. When the converted data is audited and approved, the data having the invoicing documents are stored to the database 655. After the data has been stored in the database for a predetermined period, it may be moved from a direct access storage device (DASD) and stored on optical platters. These platters may remain in an optical jukebox for another predetermined period and then migrated to an optical shelf where the data may be available for a certain period.

Having described generally, an overview of the online invoicing application service and its integration with the networkMCI Interact's network and data infrastructure, the specific functionalities of the online invoicing application, namely the online invoicing GUI application on the client platform side and the online invoicing server in the enterprise Intranet, will now be described in detail below.

Online Invoicing GUI Application

The online invoicing GUI application is implemented in Java to ensure platform independence and particularly is developed using many of the networkMCI Interact's common objects described in U.S. Pat. No. 6,115,040, and fully incorporated herein, for achieving interoperability with the application backplane. Specifically, the online invoicing GUI application's startup code implements the COApp class, typically derived from the CoAppImpl interface. The COApp provides an applet-like interface and includes applet methods such as getImage( ) and getAppletContext( ) and allows Java applet prototypes to be easily converted to COApps. The online invoicing GUI application, via the COApp, may create its own display space and present its user interface in a separate frame by having the space in one or more COAppFrame windows. The COAppFrame class and its COStdAppFrame subclass are wrappers for the Java frame class which provide COApps with standard look-and-feel elements and implement some standard behavior, such as participating in COBackPlane's window management functions. The COAppFrame is a desktop window, separate from the browser. It presents the user with a preset layout of a menu, toolbar, status bar, enterprise logo, an application icon, etc., and a main viewing area. Since a separate frame does not need to be located inside of a Web page, a concurrent (side-by-side) access to more than one networkMCI Interact application service is possible.

In an alternate embodiment, the online invoicing GUI application's startup code may be implemented using the COApplet class. The COApplet class extends the Applet class and may be launched by the browser from an HTML <Applet> tag. The COApplet class is useful in cases where more isolation from the networkMCI Interact's platform is desired, or an application needs its own browser-based display space. The COApplet class implements most of the COApp interface by forwarding it to a contained COAppImpl object.

Figure 7:
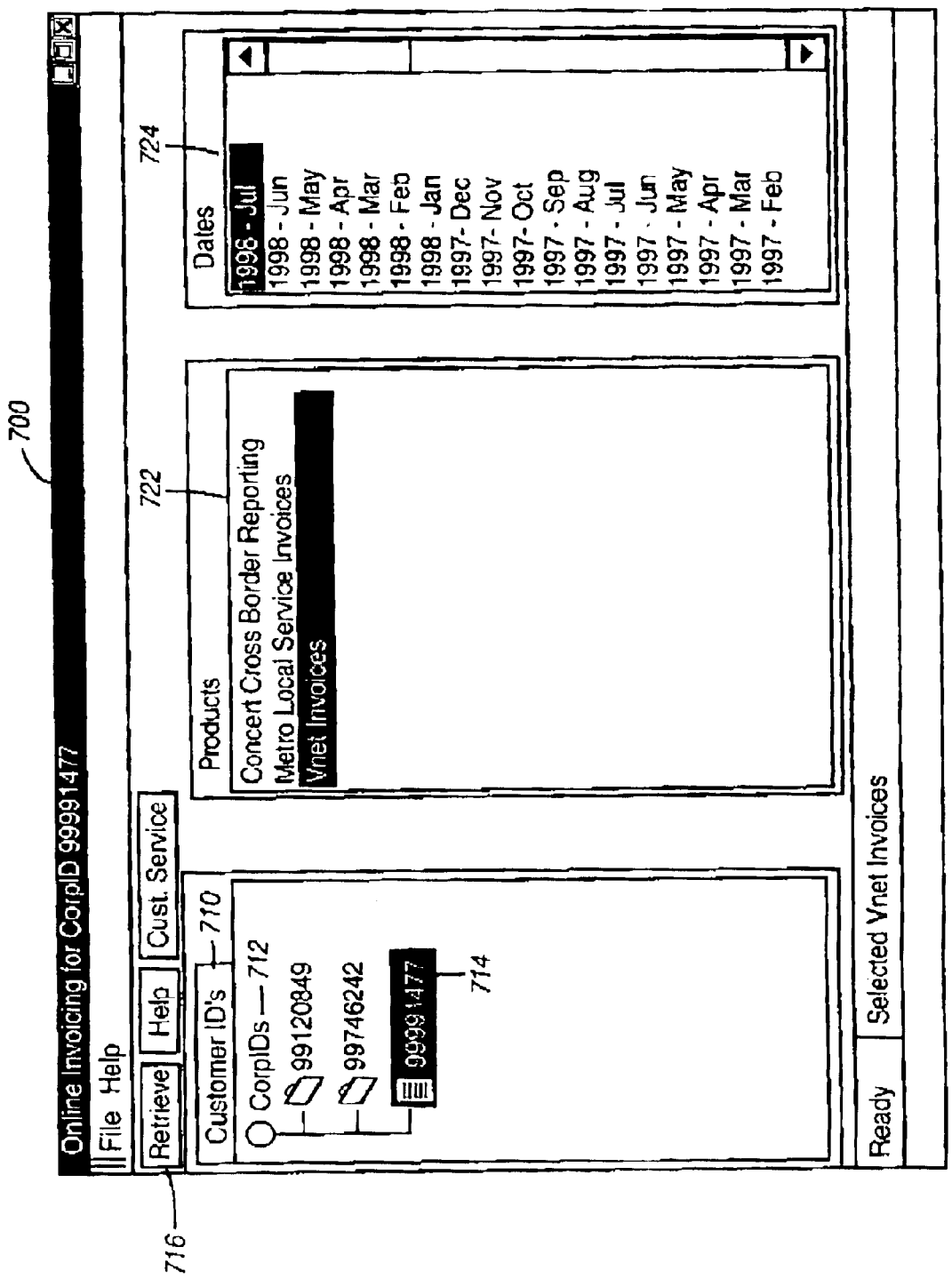
FIG. 7 is a sample criteria screen launched from the home page.

The client component of the online invoicing includes a client interface for the user to select what data to retrieve. The data is then retrieved through various application processing, and a list of invoices and reports are provided for the user to choose from for online viewing. When a customer clicks on the "online invoice" icon 252i on the home page (FIG. 4), after a proper authentication via a logon, the customer is presented with a criteria screen 700 as shown in FIG. 7. The customer may specify various types of, and date ranges for, invoices desired, such as the Vnet invoices and the Concert Cross Border Reporting, using this screen. The criteria screen 700 is divided into a customer identifier section 710, products section 722, and dates section 724. The customer identifier type includes identification by corporate id 712, account id, bill payer id, and/or mega id. Each online invoicing user is given at least one identifier type 712 and a customer identifier number 714 associated with the type at the time of order entry via the StarOE. The StarOE maintains this customer information and communicates the information to the online invoicing GUI application, when the application is invoked by the backplane applet. Accordingly, at the same time the online invoicing GUI application displays the criteria screen 700, it also populates the identifier type 712 and customer identifier 714 fields automatically as received from the StarOE user authentication and entitlement system.

The user may then select a desired identifier type from the list of identifier types shown at 712. The online invoicing GUI application then automatically fills in the customer identifier field 714 associated with the identifier type selected. In addition, if the customer's last selection was made with a certain type, e.g., corp id, the next time the customer views the criteria screen 700, the corp id identifier type will be selected automatically. After selecting a desired identifier, the user typically then may execute the search of invoices available for that identifier by clicking on the retrieve button 716, pressing an enter key, or using a fast key combination such as Alt+S.

The products and dates sections 722, 724 are used for displaying the service products for which invoice viewing is available for a given customer identifier type and the date range for the available invoices when the user executes the search, the products field 722 is filled in with the date ranges 724, indicating available invoice reports for various period ranges. For retrieving invoice documents, the user may select ranges of dates including multiple ranges of dates as shown at 724, and then click on the retrieve button 716, press enter, use the fast key combination Alt+R, or click on any area within the date range list box 724.

Figure 8:
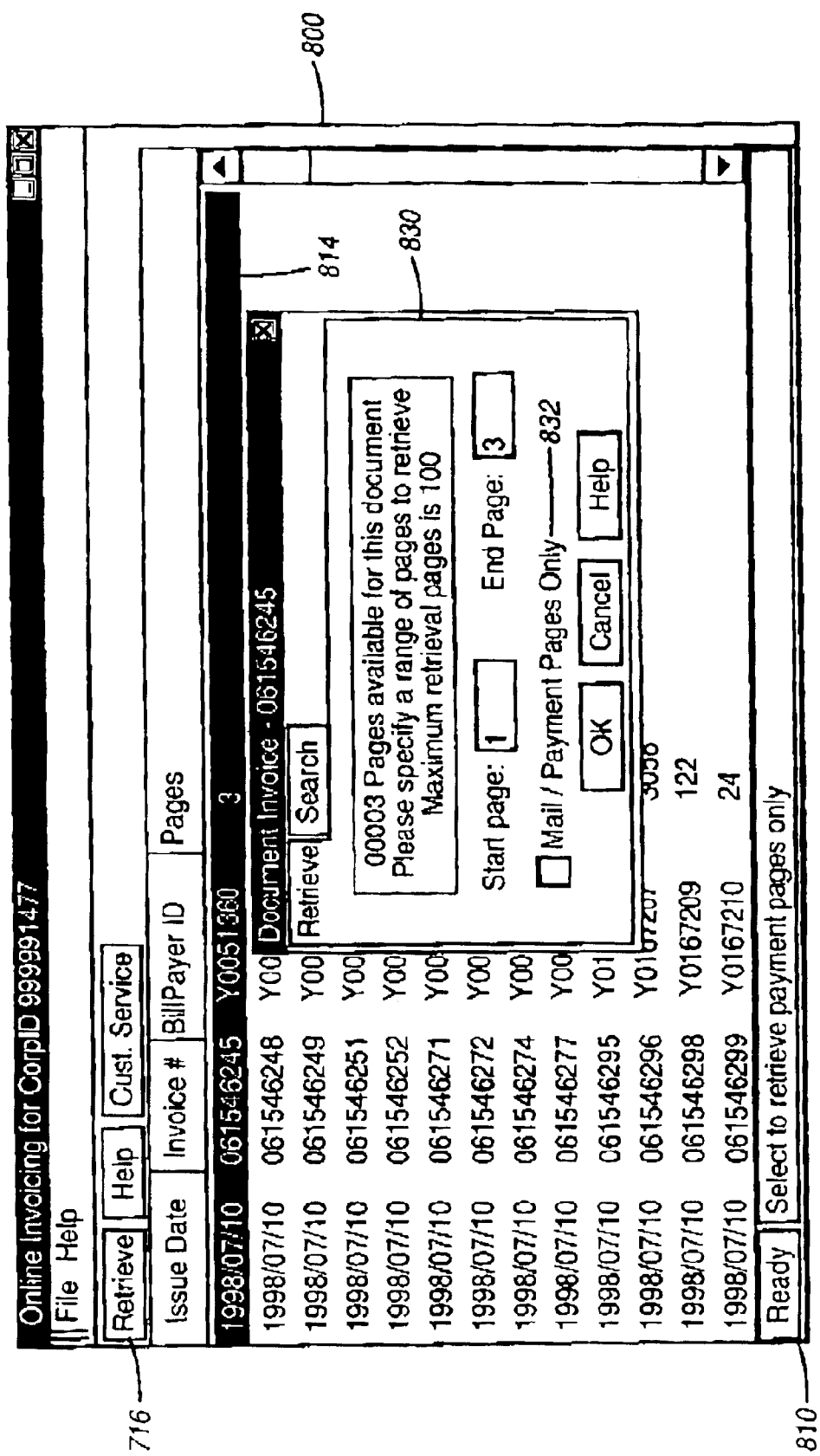
FIG. 8 is a sample screen displaying a list of invoice reports.

Upon executing the retrieve user command, the online invoicing GUI application displays the screen shown at FIG. 8 listing the report documents. For each document, date, invoice number, bill payer id, and number of pages are displayed as shown at 800. The status bar 810 at the bottom of the screen may display a number of indices (document lists) loaded. The number of indices which may be loaded at one time may be configurable by a customer via the online invoicing GUI application. An invoice report listed then may be selected and retrieved by clicking on the retrieve button 716, pressing an enter key or double clicking on a highlighted item 814, or using a fast key combination such as alt+R. When a selection is entered, a page range selection box 830 appears. The selection box 830 allows customers to enter in the desired page range for viewing. The mail/payment option 832 for retrieving only the remittance pages without having to retrieve additional invoice pages, is available from this screen.

FIG. 9 illustrates a sample invoice document 840 retrieved when an invoice item is selected from a screen 800 shown at FIG. 8. Using the menu bar 842 or a tool bar 844, a customer may save, export, print, etc., the retrieved document. Table 1 summarizes typical functions which may be accessible via the menu bar 842 and the tool bar 844.

TABLE 1

| Menu/tool bar item | Functions |
|---|---|
| Open | Open a saved document |
| Save | Save the current document |
| Print | Print the current document |
| Fax | Fax the current document |
| Batch Print | Batch Print a document |
| Find | Search the document for word(s) |
| First | Displays the first downloaded page |
| Prior | Displays the previous page |
| Next | Display the next page |
| Last | Display the last downloaded page |
| Go To | Go to a specified page |
| Magnify | Increase the font size of the displayed document |
| Reset | Reset the font of the displayed document to the default |
| Shrink | Decrease the font size of the displayed document |
| Return | Return to the screen that invoked the document |

Figure 18:
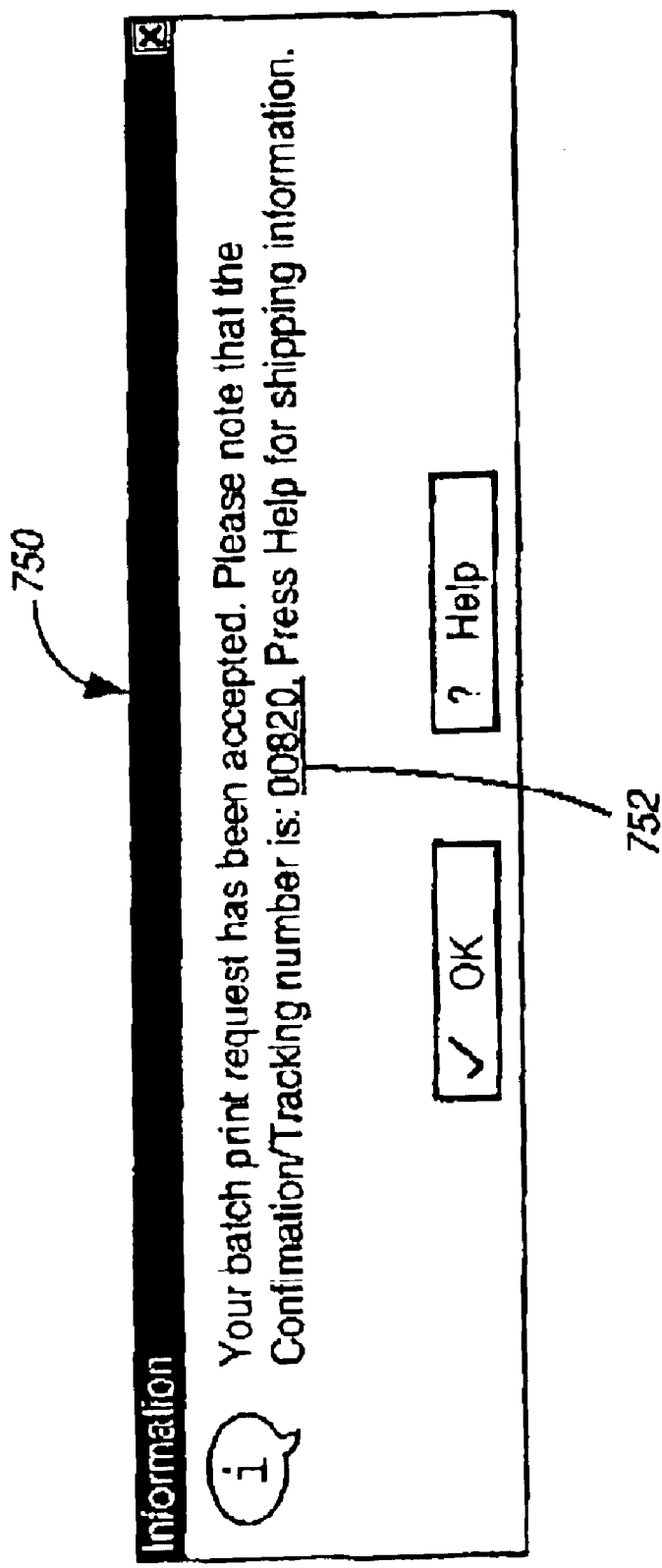
FIG. 18 shows a sample message pop-up window notifying customers of a batch print confirmation number when a batch print job has been queued.

The batch print option may allow customers to send a batch print job to be performed at the enterprise Intranet. The documents printed in batch may typically be sent to the customers via Federal Express to the location indicated by the customer, typically within 24 hours. To initiate a batch printing request, the customer may select the batch print option from a screen display. Upon selection of the option, a batch print data entry screen which may typically look like the screen 740 shown in FIG. 17 may displayed. The customer may then be prompted to enter the entry fields indicated in the screen 740, and select OK button 742. The clear button 744 clears the entries entered such that the customer may reenter the information. When the OK button 742 is pressed, a pop-up confirmation screen 750 shown in FIG. 18 may appear. This screen 750 includes a confirmation number 752 associated with a requested batch print job. The customer may track the information and status pertaining to the requested job using this confirmation number 752.

Figure 14:
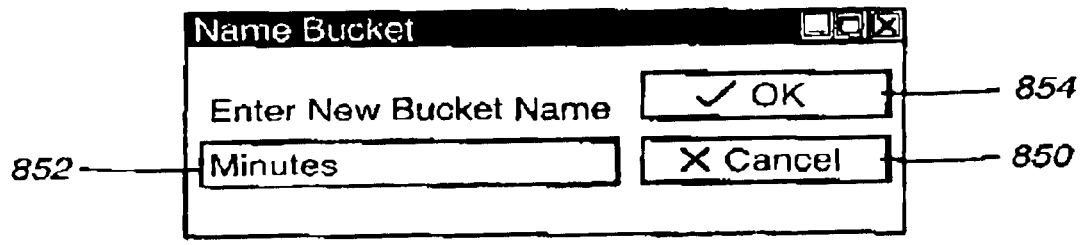
FIG. 14 is a dialogue box used for naming the accumulator buckets.
Figure 15:
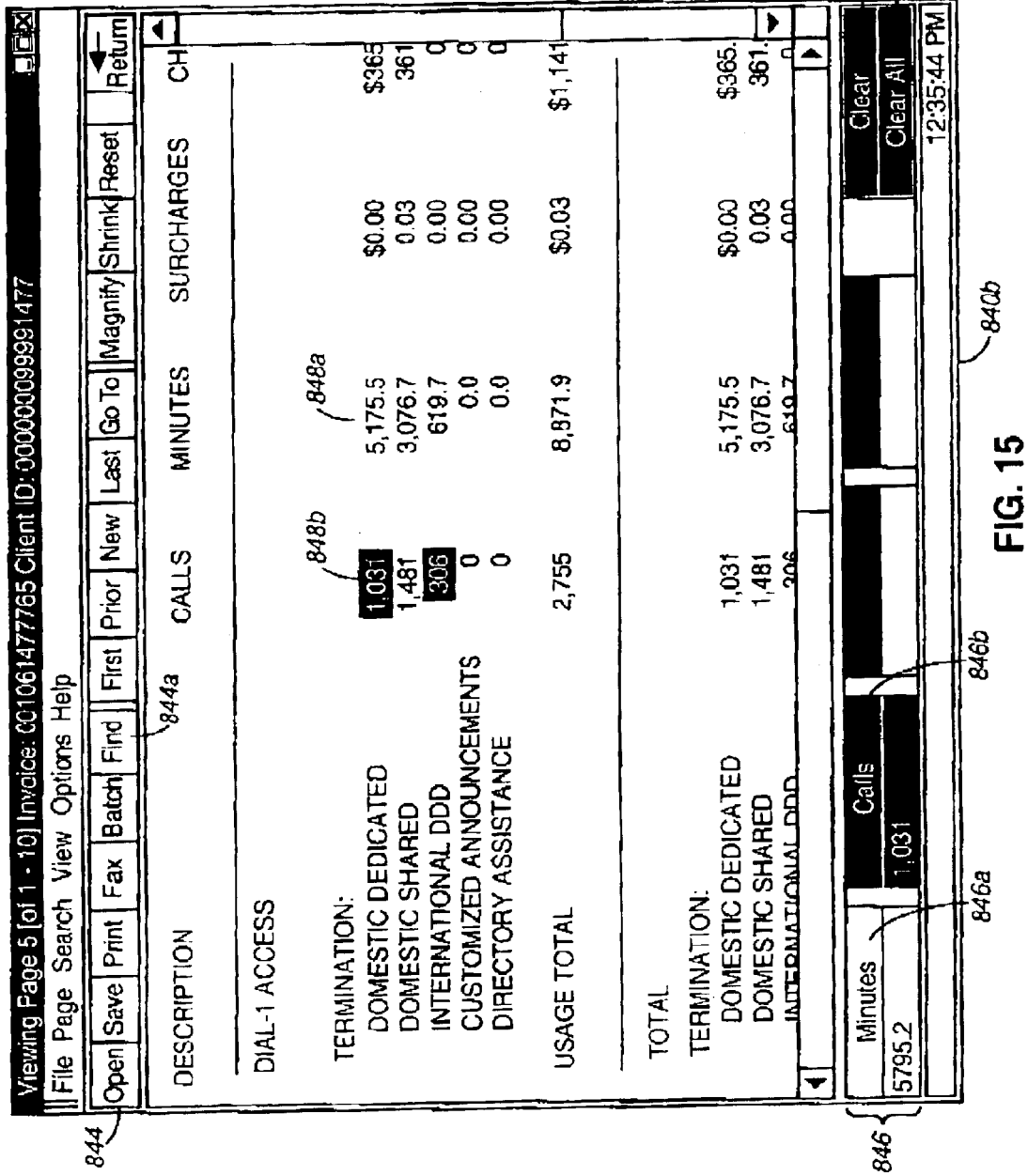
FIG. 15 shows a sample invoice display screen with the accumulator buckets having the sum of the figures highlighted.

Another feature provided by the present invention may include a accumulator functionality. An accumulator function allows customers to add up numerical figures, such as minutes and charges, by highlighting the numbers directly on the screen. For example, to access the accumulator function, a customer may click on an appropriate selection from a menu bar 842, for example, a "Show Buckets" selection. The "buckets" accumulator may then appear at the bottom of the screen, typically like the one shown at 846 in FIG. 13. For instance, four buckets may be used for separate additions at one time, as shown at 846 and may be renamed by double clicking on the title. A pop-up box 850 at FIG. 14 may be displayed upon double clicking on the title 846. A customer may then type in a new name, such as "Minutes, " 852 and click on OK 854. The title may then be automatically replaced with the typed name 846a as shown at FIG. 15. To add figures, the customer may click on one of the buckets and double click on the FIGS. 848a to be added. The FIGS. 848a may be highlighted in the same color as the bucket 848a to which they are being added. Double clicking on the added (highlighted) figure may subtracts that figure from the bucket. Calculated total in a bucket may be cleared by clicking on the clear button 820a after selecting a bucket. Clear all 820b clears all the buckets.

Figure 16:
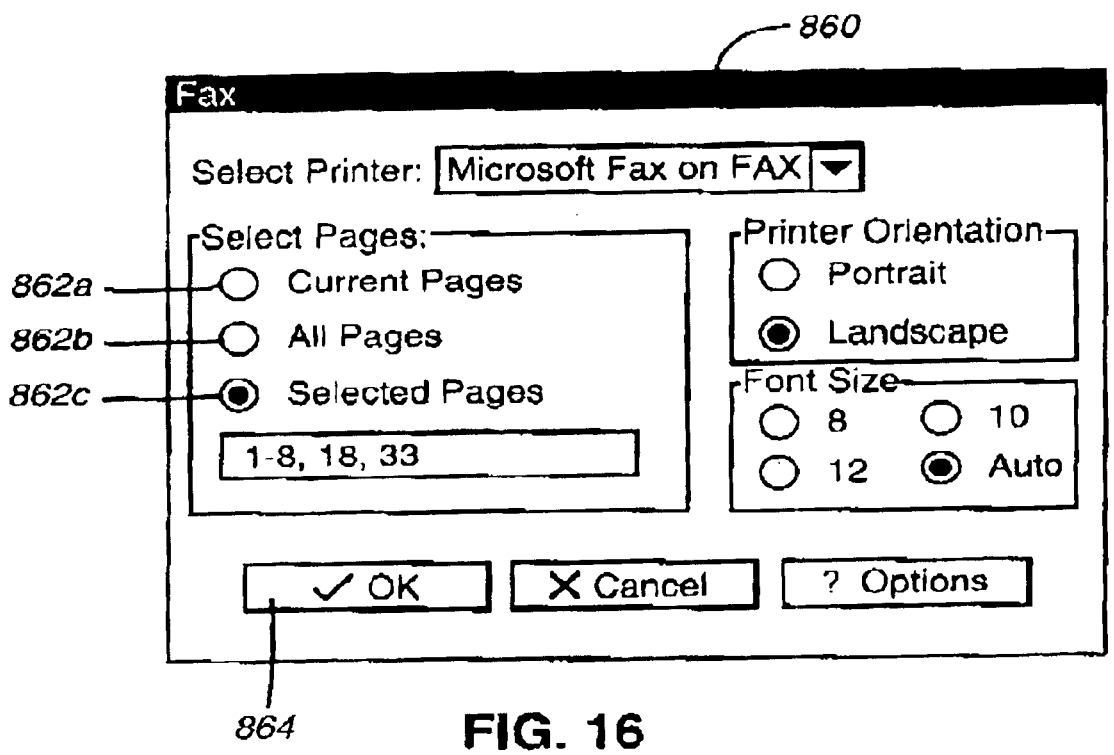
FIG. 16 shows a dialogue box used for faxing the invoice document.

An additional feature offered by the online invoicing application may include an ability to fax the retrieved documents. When a fax button 844*a* is pressed from the tool bar which may typically look like the tool bar shown at FIG. 15, a fax dialogue 860 such as shown at FIG. 16 may appear. The customer may then fax to the customer specified location, a current page, specified range of pages, or the entire document by making an appropriate selection on select pages section 862 and clicking OK button 864.

Online Invoicing Server

As described above, the online invoicing provides on-line visibility to various networkMCI Interact documents. In presenting various documents online to a customer, the GUI client application communicates to a online invoicing server via the proxy for retrieving up-to-date information which the server maintains. These documents are indexed and stored in the online invoicing's database 655 (FIG. 6). The online invoicing server includes several processes for performing the indexing and storing of the documents.

Figure 11:
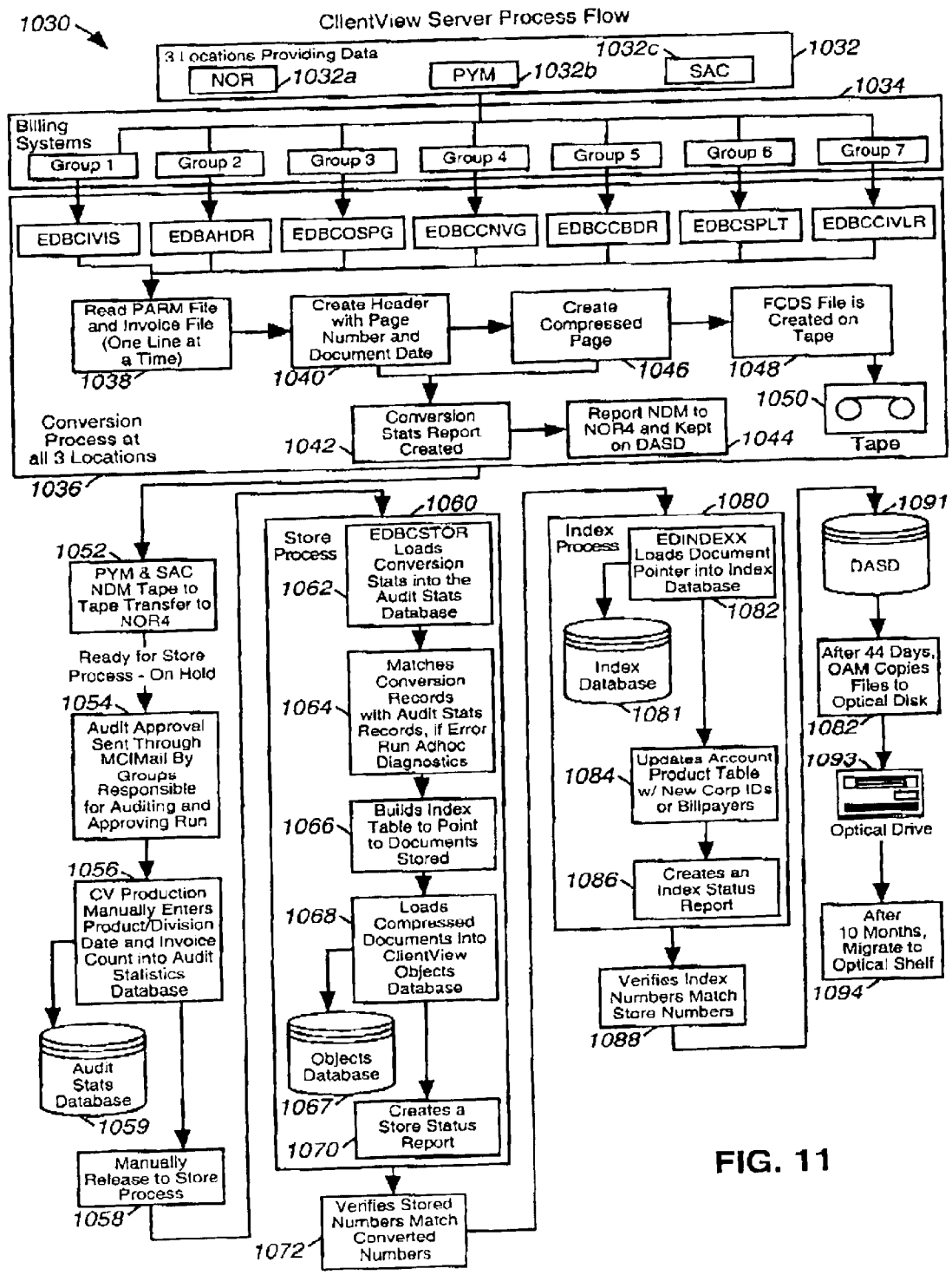
FIG. 11 is a flow diagram illustrating an online invoicing back-end server process flow during document indexing and storing.

FIG. 11 illustrates a process flow diagram of the online invoicing server. The server may receive data from a number of data centers 1032. FIG. 11 shows three data center locations: North Royalton (NOR) 1032*a*, Perryman (PYM) 1032*b*, and Sacramento (SAC) 1032*c*, as illustrative examples. At each site, invoice data associated with various products is available from various billings systems associated with the products, as shown at 1034. The products may include Vnet, toll free, Cross Border, Mega, etc.

In a preferred embodiment, an online invoicing's conversion process 1036 is used to convert documents at each of the data centers. The conversion process generally defines the key information necessary to retrieve the document and compresses the document for storing. Each conversion process 1036 generally performs the same tasks. More specifically, these tasks include creating a formatted compressed data set (FCDS) file and a conversion stats report for each conversion run. The FCDS file is the document which may eventually be incorporated into the online invoicing database. At step 1038, the online invoicing conversion process reads in a PARM file and an invoice file. The PARM file includes document information such as the logical record length. The invoice file is read one line at a time and at step 1040, key information including page numbers and document dates is placed in a header record which is kept in memory until the FCDS file is created. At step 1046, the conversion process creates compressed pages of the document. The compressed pages follow the header record in the FCDS file. Once the FCDS file is created at step 1048, the file is stored on tape at step 1050, and the PYM and SAC locations NDM the tape to NOR4 at step 1052. At step 1042, the conversion stats report is also created which includes page information and conversion information associated with each conversion run. The last line of the report has the conversion stats record, which includes the number of pages converted and the number of headers created. This report is then NDM'd to NOR4 by PYM 1032*b* and SAC 1032*c* and kept on DASD for future reviews and audit verification.

The FCDS file is generally placed on hold, as indicated at step 1054, until audit approval is received through MCIMail, which is sent by various groups responsible for auditing and approving the document files sent to the online invoicing. Once the audit approval e-mail is received, an online invoicing production manually enters the product/division date and the invoice count into the audit statistics database 1059, at step 1056. The store job is manually released at step 1058 by the online invoicing production control after audit approval is received.

The online invoicing includes a DB2 database subsystem residing in a NOR4 mainframe. The subsystem further includes an object database and an index database. An online invoicing store process 1060 loads the compressed document to an online invoicing object database and an online invoicing index load process 1080 stores index pointers to each document in the index database. An audit check is executed to ensure that the correct number of documents are added to the online invoicing databases during the object load and index load processes.

More particularly, the store process loads the conversion stats record into the audit stats database at step 1062. At step 1064, the conversion records are then matched against the manually entered audit stats records. The store process 1060 also includes loading of the FCDS file from which is builds an index for each object and an index file, which includes the pointers to the document, as shown at step 1066. The store process 1060, the loads the compressed documents into the online invoicing object database 1067, as indicated at step 1068. At step 1070, the store process 1060 then creates a store status report and loads the report into the audit stats database 1059. At step 1072, an audit checkpoint verifies that the stored numbers match the converted numbers. If there are any errors with the numbers in the audit stats database at any point in this process, the job may automatically stop the store process 1060 until the feed/problem is corrected. Once these numbers are verified, the index process 1080 may begin.

The index process 1080 at step 1082, i.e., EDINDEXX as shown in FIG. 11 as an example, generally loads the index pointer for each document, which are typically created by the store process 1060. At step 1084, the process 1080 also updates the account product table with new customer identifiers such as the corp ids or billpayers. At step 1086, the index process 1080 creates an index status report. At step 1088, another audit checkpoint verifies that the index numbers match the stored numbers. The stored and indexed data are kept on DASD 1091 for a predetermined number of days, e.g., 45 days as shown at step 1092. After the predetermined number of days, the object access method (OAM) copies the files from DASD 1091 to an optical disk via the optical drive 1093. After another predetermined period, OAM migrates the objects from the optical disk to the optical shelf as shown at step 1094, where they remain available for another predetermined period of time. Once the indexes are loaded into the database, the documents are available for viewing.

The following database tables are included in the online invoicing database: a product cross reference table which assigns the online invoicing product code to the product name; a CDSPARM table which keeps the store process run statistics to allow for a restart when necessary and which includes an entry for each product code and runstream; an EDBAAPPL table which assigns a product code to a store group; a statistics audit table which keeps audit statistics for each product/runstream logged by the store process; and a conversion program parameter file which defines where the conversion may find the documents key information.

The information on documents for imaging and storing are typically received from the various networkMCI Interact's application services. Table 2 lists various billing systems providing product feeds to online invoicing for document imaging. Additional data feed may also be accommodated as more services are added.

TABLE 2

| Billing Systems | Product feeds |
|---|---|
| New Commercial Billing System (NCBS) | VNET, Vision invoices, Vision MIR's, Vision trend reports |
| Cross Border | Stentor VNET Cross Border Discount Report, Stentor Vision Cross Border Discount Report, Concert Cross Border Discount Reporting |
| BMSE | New Product Billing Solutions, Vision Location Reporting, Answernet 800 & Vision, directlineMCI 800 & Vision, Vision LDSA and AT&T Backup reports |
| MEGA | networkMCI Calling, HyperStream, MEGA products |
| Directed Billing | VNET Directed Billing and Vision Directed Billing |
| Network Systems Osprey | networkMCI Business, InternetMCI Session Detail Reports, VNET and Vision Session Detail Reports |
| PLBS | Private Line: T-1, VGPL, DS0, FT-1, DDS, TDS, T45, AND DS3 |
| Tollfree | toll free invoices, call detail and rebills |
| Metro/local | Subscriber Billing |
| Outside Vendor | PPSB statements, Aurora PPV and PPP statements |

The online invoicing server application is typically written in COBOL II using CICS/DB2 and OAM. The persons skilled in the art would appreciate that the server application may also be implemented with any other compiler languages or software tools. The server application includes a startup transaction (EDUP), and a multipurpose transaction, EDS2. The EDUP transaction passes several DB2 tables such as a function table, a version control table, and the batch print request table. The EDUP transaction also calls OAM to verify OAM is active and to get the token for future calls to OAM. An in-core table is built for system information and temp storage records are built for version control and batch print pricing. The EDUP is generally executed at CICS startup time.

EDS2 is a multi-purpose transaction which is started when a request is received from a client GUI application. Its functions may include product and date listing, index retrieval such as shown at 800 FIG. 8, and batch print request storing. The transaction uses the common top-level function (EDOCS000) and links to a lower level function designed to perform a specific task, based on a specific function. The lower level function results are passed back to the top-level function which checks return codes for possible error. The data result is then passed to the client GUI application via the proxy and the Web/dispatcher 635 (FIG. 6), and statistics are written to a VSAM file. EDS2 is also executed for document retrieval for retrieving invoice documents shown at 840 FIG. 9. It uses the common top-level function and links to lower level functions to perform the retrieval processing.

Figure 12:
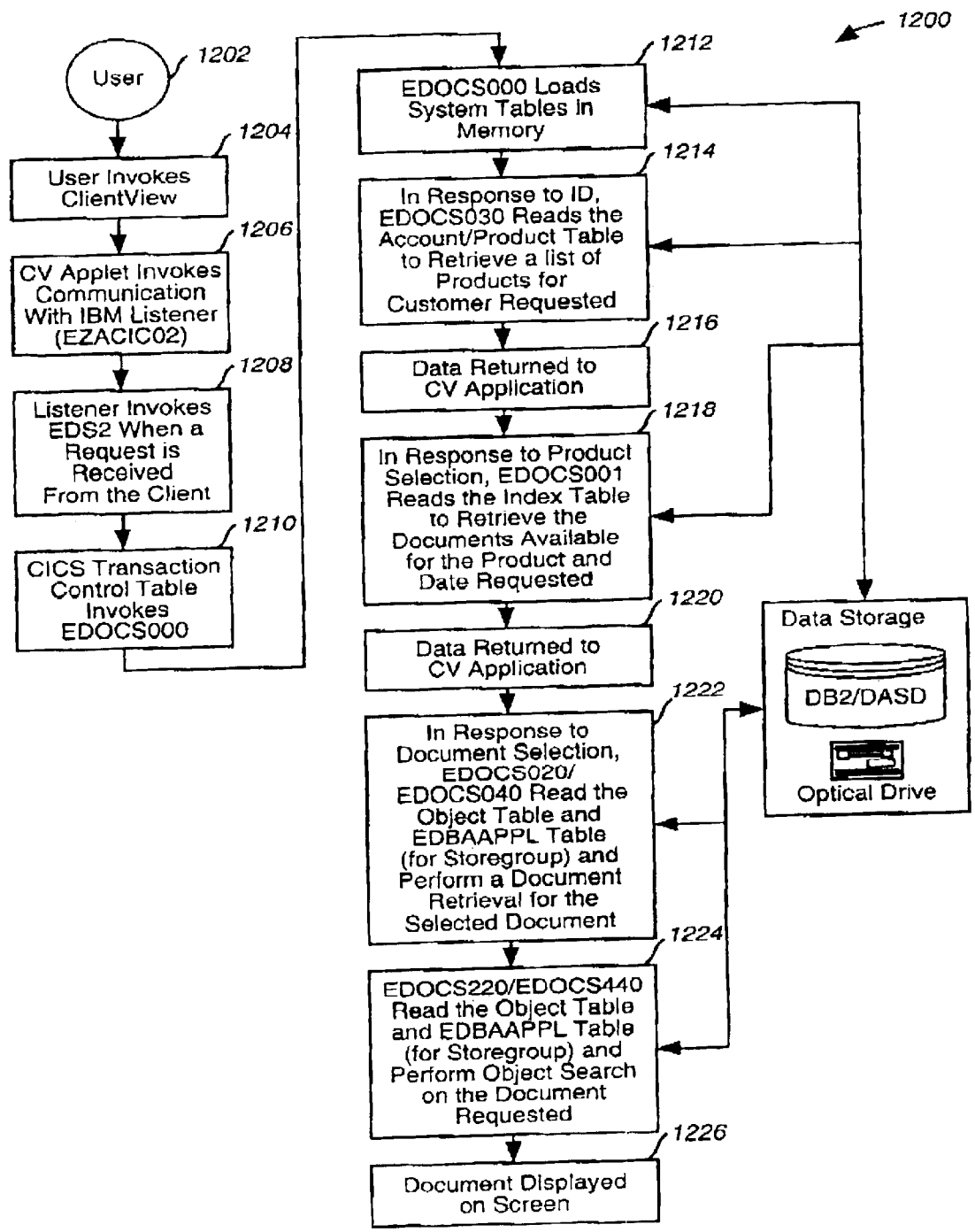
FIG. 12 is a flow diagram illustrating an online invoicing back-end server process flow when responding to client requests for document presentation.

FIG. 12 is a detailed server process flow diagram 120 illustrating the server processes for responding to the client requests. After a user 1202 properly logs on the networkMCI Interact and invokes the online invoicing application at step 1204, by selecting an appropriate icon on the networkMCI Interact homepage, the online invoicing client GUI application, at step 1206, generally requests communications with a listener process running in the server. The communications request is typically performed via the web server, dispatcher, and the proxy, as described above with reference to FIG. 6.

Generally, the communications from the online invoicing server to the client workstation is performed by a set of calls to the TCP/IP address space. As an example, a listener process, EZACIC02 is activated at CICS initiation, and constantly "listens" for activities. When a request is received from the client, the listener, e.g., EZACIC02, invokes the EDS2 transaction, at step 1208. At step 1210, CICS invokes the first program, i.e., EDOCS000 in the example shown, in the transaction EDS2 via the CICS transaction control table. Then, at step 1212, EDOCS000 loads system tables into memory. In addition, EDOCS000 also makes calls to TCP/IP to communicate with the client GUI application. EDOCS000 is also responsible for logging both successful and unsuccessful requests, as well as routing the request to one of many sub-programs, based on a function code and an object name. The sub-programs include EDOCS030, EDOCS001, EDOCS020/EDOCS040, and EDOCS220/EDOCS440, each of which will be described in more detail below.

When the listener process has a data to pass to EDOCS000, EDOCS000 invokes a RETRIEVE command to get the data. EDOCS000 then performs a take socket and responds to the client by a write socket. The client then typically responds to the server with a function code and additional data such as a customer identifier, dates, etc. EDOCS000 performs data validation such as function codes, checks to see if the system is up, supplies pricing information for batch print, links to lower level functions, checks the results of the lower level results, produces error entries where needed, writes statistics, and passes any data retrieved (or an error) back to the client GUI application.

After each call to a subroutine, EDOCS000 checks a return code. EDOCS000 also checks return codes from calls to the TCP/IP and posts an error message when the TCP/IP return code is a non-zero value, indicating an error. The errors are generally logged in the TCP data file and may be reviewed as needed. When all the processing necessary for responding to the client is complete and response data is successfully sent to the client, the client GUI application sends an acknowledgment for the receipt of the data, back to the server. The socket is then closed, freeing it for another request to be communicated.

Referring back to FIG. 12, at step 1214, EDOCS030 is executed when a request is made to retrieve all products and dates associated with a customer identifier. This process gets all entries from the account/product cross-reference table for the customer identifier received from the client GUI application. For each entry in the account/product cross-reference table found, the process looks up the product on the product cross-reference table. If the group is different than any group processed yet, then the process adds an additional entry at the group level, gets the product description from the product cross-reference, and gets distinct dates for addition to the table. When the entries in the table have been exhausted, the process sorts the products, e.g., in an alphabetical order by product description followed by dates sorted in descending order, for proper display at the client workstation. At step 1216, the sorted data is returned to the client GUI application for viewing by the user.

EDOCS000 links to EDOCS001 and executes it when a client GUI application requests index retrieval for specified dates within specified products. EDOCS000 passes in the customer identifier, the product and a list of dates received from the client GUI application as entered in the criteria screen 700 at FIG. 7. At step 1218, EDOCS0001 reads the index table and extracts from the online invoicing database all matching entries and sorts them in order of date and invoice numbers. Different sorting order may be utilized for different products. The entries meeting the product/date criteria are then sent back to the client GUI application for presentation to a customer at step 1220. The matching entry message, which is sent to the client GUI application includes a subset of entry records found.

EDOCS000 links to EDOCS020/EDOCS040 and executes either one when a client GUI application requests for document retrieval such as the invoice document 840 shown at FIG. 9. EDOCS020 and EDOCS040 are generally used for document retrieval and are clones of each other. The difference between the two is that EDOCS020 was written for new style objects and EDOCS040 was written to handle old style objects. In their operation, EDOCS020 and EDOCS040 generally allocate storage for the document and retrieve the document meeting the requested page range into the allocated storage as shown at step 1222. The retrieved document is then sent back to the client GUI application for presentation to the customer.

At step 1224, EDOCS220 and EDOCS440 are used for object searches on the document requested. These processes perform similar functions as do the EDOCS020 and EDOCS040 processes. They typically get the collection name and the object, and loop through the index portion of the object to find pages in the requested range for the requested document. At step 1226, the retrieved document is sent back to the client GUI application and is displayed on the user's workstation.

For servicing batch-printing requests, EDOCS000 may link to EDOCS050 and execute it. A next available request number is determined by getting the EDBPREQ record in the database and adding one to the last request number. EDBPREQ record is then updated. The information passed to EDOCS050 is then mapped into the EDBPRINT table layout, and a new row is inserted into DB2. Errors from EDOCS050 are sent to EDOCS000, which reports them to the client GUI application.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A Web-based invoice viewing system for enabling a customer to retrieve an invoice, over the Internet, said customer using a client browser application located at a customer workstation for communications with the invoice viewing system, said system comprising:

at least one secure server for managing customer sessions over the Internet, the secure server supporting a secure socket connection enabling encrypted communications between the client browser application and the secure server;

an invoice presentation device for enabling selection and presentation of invoice documents in accordance with customer entitlements, generating an invoice request message in response to customer selection of a specific invoice option and forwarding the invoice request message via the secure server; and an invoice server device for receiving the invoice request message, accessing the database in response to a request message and generating a response message for forwarding back to the invoice presentation device via the secure server, wherein the response message is assembled in a form suitable for display and the invoice presentation device presents a customer selected invoice document at the client workstation, and wherein the invoice presentation device includes a presentation applet downloaded from the secure server, the presentation applet launched within a Web browser window.

2. The Web-based invoice viewing system as claimed in claim 1, wherein the invoice presentation device further includes one or more dynamic accumulator(s) for enabling the customer to add numerical figures presented in the invoice document by highlighting the figures directly on the invoice document at the client workstation.

3. The Web-based invoice viewing system as claimed in claim 1, wherein the invoice presentation device further automatically populates products and date range fields associated with a customer identifier, the products and date range fields listing specific application services and time periods for which invoice documents are available for presentation.

4. The Web-based invoice viewing system as claimed in claim 1, wherein the invoice presentation device further enables the customer to send a batch printing request for a specific invoice document, wherein the invoice server device queues a batch printing job in response to the batch printing request for printing at the enterprise and delivery to the customer.

5. The Web-based invoice viewing system as claimed in claim 4, wherein the invoice presentation device further generates a tracking number associated with the batch printing request and enables the customer to confirm and track the current status of the batch printing job.

6. The Web-based invoice viewing system as claimed in claim 1, wherein the invoice presentation device further enables the customer to fax a specific invoice document which is presented at the client workstation to a customer specified location.

7. The Web-based invoice viewing system as claimed in claim 1, wherein the invoice presentation device further enables the customer to retrieve via the integrated interface, information including product availability, scheduled systems availability, and status information.

8. The Web-based invoice viewing system as claimed in claim 1, wherein the invoice server device includes a database of image files associated with documents from the application service.

9. The Web-based invoice viewing system as claimed in claim 8, wherein the database of image files further includes an object database, and the invoice server device further includes:

conversion process for imaging documents by defining key information necessary to retrieve documents from the application service and compress the documents for storing; and store process for loading the compressed documents into the object database.

10. The Web-based invoice viewing system as claimed in claim 9, wherein the database of image files further includes an index database, and the invoice server device further includes index load process for storing index pointers pointing to the compressed documents into the index database.

11. A method of remotely retrieving invoice reports at a customer workstation having a client browser, the invoice reports relating to network services provided to the customer, the method comprising:

managing a client session over the Internet by providing a secure server which supports a secure socket connection enabling encrypted communications between the client browser application and the secure server;

initiating a download of a presentation applet from the secure server to be launched by the client browser;

presenting at the customer workstation invoice report selection options representing available invoice documents associated with the network services;

receiving an invoice request message having a customer selected option at an invoice presentation device;

forwarding the invoice request message from the invoice presentation device to an invoice server device via the secure server;

generating an invoice response message having an invoice document data associated with the selected option in response to the invoice request message;

communicating the invoice response message to the client browser application via the secure server; and presenting the invoice document data at the customer workstation.

12. The method according to claim 11, wherein the method further comprises:

enabling accumulation of numerical figures presented in the invoice document data by allowing the customer to highlight the numerical figures directly on the invoice document data; and presenting dynamically the accumulated numerical figure at the client workstation as the customer highlights the numerical figures.

13. The method according to claim 11, wherein the method further comprises:

enabling the customer to send a batch print request at the client workstation;

associating a document with the batch print request;

queuing a batch print job for the document at an enterprise; and delivering printed document to the customer.

14. The method according to claim 13, wherein the method further comprises:

generating a confirmation number associated with the batch print request, wherein the customer at the customer workstation is enabled to track the current status of the batch print job.

15. The method according to claim 11, wherein the method further comprises:

enabling the customer at the customer workstation to fax an invoice document presented at the customer workstation to a location specified by the customer.

16. The method according to claim 11, wherein the method further comprises:

presenting information including product availability, scheduled systems availability, and status information to the customer at the customer workstation.

17. The method according to claim 11, further comprising:

maintaining a database of image files associated with documents from the enterprise applications.

18. The method according to claim 17, wherein the step of maintaining further includes:

defining key information necessary to retrieve documents from the enterprise applications associated with the network services;

compressing the documents for storing; and loading the compressed documents into an object database within the database of image files.

19. The method according to claim 18, wherein the step of maintaining further includes: storing index pointers pointing to the compressed documents in an index database within the database of image files.

20. An on-line invoicing system supporting user access of electronic invoices for telecommunication services, the system comprising:

a secure server configured to support secure communication channel over a packet switched network, wherein the secure server stores a presentation applet that is downloadable for viewing an invoice document by a client application; and an invoice server configured to receive a request message from the client application requesting information of an invoice document, the invoice server accessing a database that stores a billing information collected from a plurality of billing systems associated with the telecommunication services and generating a response message containing the information corresponding to the requested invoice document, the response message being transmitted to the client application over the secure communication channel, wherein the client application downloads the presentation applet from the secure server and launches the presentation applet to view the requested invoice document.

21. A server for supporting on-line invoicing and providing user access of electronic invoices for telecommunication services, the server comprising:

an interface configured to support secure communication channel over a packet switched network; and a memory configured to store a presentation applet that is downloadable for viewing an invoice document by a client application over the secure communication channel, wherein the client application transmits a request message to an invoice server requesting information of an invoice document, the invoice server accessing a database that stores a billing information collected from a plurality of billing systems associated with the telecommunication services and generating a response message containing the information corresponding to the requested invoice document, the response message being transmitted to the client application over the secure communication channel, wherein the client application downloads the presentation applet stored in the memory and launches the presentation applet to view the requested invoice document.

22. An invoice server for supporting user access of electronic invoices for telecommunication services, the server comprising:

an interface configured to receive a request message from a client application requesting information of an invoice document, wherein the client application downloads a presentation applet from a secure server that supports secure communication channel over a packet switched network; and a processor configured to access a database that stores a billing information collected from a plurality of billing systems associated with the telecommunication services and to generate a response message containing the information corresponding to the requested invoice document, the response message being transmitted to the client application over the secure communication channel, wherein the client application launches the downloaded presentation applet to view the requested invoice document.

* * * * *